United States Patent
Barak et al.

(10) Patent No.: US 12,007,582 B2
(45) Date of Patent: Jun. 11, 2024

(54) REDUCED HEIGHT PENALTY FOR FOLDED CAMERA

(71) Applicant: Corephotonics Ltd., Tel Aviv (IL)

(72) Inventors: Gal Barak, Tel Aviv (IL); Itay Yedid, Tel Aviv (IL); Ephraim Goldenberg, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/317,992

(22) Filed: May 16, 2023

(65) Prior Publication Data

US 2023/0280597 A1 Sep. 7, 2023

Related U.S. Application Data

(63) Continuation of application No. 17/187,810, filed on Feb. 28, 2021, now Pat. No. 11,686,952, which is a
(Continued)

(51) Int. Cl.
*G02B 27/64* (2006.01)
*G02B 7/09* (2021.01)
(Continued)

(52) U.S. Cl.
CPC ............... *G02B 27/64* (2013.01); *G02B 7/09* (2013.01); *G03B 13/36* (2013.01); *G03B 17/17* (2013.01); *H04N 23/57* (2023.01)

(58) Field of Classification Search
CPC .... G02B 27/64; G02B 27/646; G02B 27/648; G02B 7/04; G02B 7/09; G03B 13/32;
(Continued)

(56) References Cited

U.S. PATENT DOCUMENTS

| | | |
|---|---|---|
| 3,085,354 A | 4/1963 | Rasmussen et al. |
| 3,584,513 A | 6/1971 | Gates |

(Continued)

FOREIGN PATENT DOCUMENTS

| | | |
|---|---|---|
| CN | 101276415 A | 10/2008 |
| CN | 201514511 U | 6/2010 |

(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Clayton E. LaBalle
*Assistant Examiner* — Fang-Chi Chang
(74) *Attorney, Agent, or Firm* — Nathan & Associates; Menachem Nathan

(57) ABSTRACT

Actuators for actuating a lens in a folded camera, folded cameras including such actuators and dual-cameras including such folded cameras. The actuators actuate a lens having a lens optical axis for auto-focus (AF) and optical image stabilization (OIS) and comprise a stationary sub-assembly that includes an OIS coil having an OIS coil plane and an AF coil having an AF coil plane, and a lens actuating sub-assembly movable relative to the stationary sub-assembly with a lens holder holding the lens, wherein the OIS coil plane is perpendicular to the AF coil plane and wherein the lens optical axis lies between the OIS coil plane and the AF coil plane. Some actuators have a design using VCM actuation and a reduced height due to top and/or bottom openings in actuator envelopes.

7 Claims, 25 Drawing Sheets

Related U.S. Application Data continuation of application No. 16/475,267, filed as application No. PCT/IB2018/060203 on Dec. 17, 2018, now Pat. No. 10,976,567.

(60) Provisional application No. 62/677,012, filed on May 27, 2018, provisional application No. 62/672,754, filed on May 17, 2018, provisional application No. 62/658,819, filed on Apr. 17, 2018, provisional application No. 62/626,306, filed on Feb. 5, 2018.

(51) Int. Cl.
*G03B 13/36* (2021.01)
*G03B 17/17* (2021.01)
*H04N 23/57* (2023.01)

(58) Field of Classification Search
CPC ........ G03B 13/34; G03B 13/36; G03B 17/17; H04N 23/57
See application file for complete search history.

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Jeda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |

(56) References Cited

U.S. PATENT DOCUMENTS

| | | |
|---|---|---|
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Magawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |

(56) References Cited

U.S. PATENT DOCUMENTS

| | | |
|---|---|---|
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0288865 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0184010 A1 | 6/2018 | Cohen et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2018/0368656 A1 | 12/2018 | Austin et al. |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0213712 A1 | 7/2019 | Ashdan et al. |
| 2019/0215440 A1 | 7/2019 | Rivard et al. |
| 2019/0222758 A1 | 7/2019 | Goldenberg et al. |
| 2019/0228562 A1 | 7/2019 | Song |
| 2019/0297238 A1 | 9/2019 | Klosterman |
| 2020/0103726 A1 | 4/2020 | Shabtay et al. |
| 2020/0104034 A1 | 4/2020 | Lee et al. |
| 2020/0134848 A1 | 4/2020 | El-Khamy et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2021/0180989 A1 | 6/2021 | Fukumura et al. |
| 2021/0333521 A9 | 10/2021 | Yedid et al. |
| 2022/0252963 A1 | 8/2022 | Shabtay et al. |

FOREIGN PATENT DOCUMENTS

| | | | |
|---|---|---|---|
| CN | 102215373 A | 10/2011 | |
| CN | 102739949 A | 10/2012 | |
| CN | 102982518 A | 3/2013 | |
| CN | 103024272 A | 4/2013 | |
| CN | 203406908 U | 1/2014 | |
| CN | 103841404 A | 6/2014 | |
| CN | 205301703 U | 6/2016 | |
| CN | 105827903 A | 8/2016 | |
| CN | 105847662 A | 8/2016 | |
| CN | 107608052 A | 1/2018 | |
| CN | 107682489 A | 2/2018 | |
| CN | 109729266 A | 5/2019 | |
| EP | 1536633 A1 | 6/2005 | |
| EP | 1780567 A1 | 5/2007 | |
| EP | 2523450 A1 | 11/2012 | |
| JP | S59191146 A | 10/1984 | |
| JP | 04211230 A | 8/1992 | |
| JP | H07318864 A | 12/1995 | |
| JP | 08271976 A | 10/1996 | |
| JP | 2002010276 A | 1/2002 | |
| JP | 2003298920 A | 10/2003 | |
| JP | 2003304024 A | 10/2003 | |
| JP | 2004056779 A | 2/2004 | |
| JP | 2004133054 A | 4/2004 | |
| JP | 2004245982 A | 9/2004 | |
| JP | 2005099265 A | 4/2005 | |
| JP | 2005122084 A | 5/2005 | |
| JP | 2005321592 A | 11/2005 | |
| JP | 2006237914 A | 9/2006 | |
| JP | 2006238325 A | 9/2006 | |
| JP | 2007228006 A | 9/2007 | |
| JP | 2007306282 A | 11/2007 | |
| JP | 2008076485 A | 4/2008 | |
| JP | 2008271026 A | 11/2008 | |
| JP | 2010204341 A | 9/2010 | |
| JP | 2011055246 A | 3/2011 | |
| JP | 2011085666 A | 4/2011 | |
| JP | 2011138407 A | 7/2011 | |
| JP | 2011203283 A | 10/2011 | |
| JP | 2012132739 A | 7/2012 | |
| JP | 2013101213 A | 5/2013 | |
| JP | 2013106289 A | 5/2013 | |
| JP | 2016105577 A | 6/2016 | |
| JP | 2017146440 A | 8/2017 | |
| KR | 20070005946 A | 1/2007 | |
| KR | 20090058229 A | 6/2009 | |
| KR | 20100008936 A | 1/2010 | |
| KR | 20110080590 A | 7/2011 | |
| KR | 20130104764 A | 9/2013 | |
| KR | 1020130135805 A | 11/2013 | |
| KR | 20140014787 A | 2/2014 | |
| KR | 101428042 B1 | 8/2014 | |
| KR | 101477178 B1 | 12/2014 | |
| KR | 20140144126 A * | 12/2014 | |
| KR | 20140144126 A | 12/2014 | |
| KR | 20150118012 A | 10/2015 | |
| KR | 20170105236 A | 9/2017 | |
| KR | 20180120894 A | 11/2018 | |
| KR | 20130085116 A | 6/2019 | |
| WO | 2000027131 A2 | 5/2000 | |
| WO | 2004084542 A1 | 9/2004 | |
| WO | 2006008805 A1 | 1/2006 | |
| WO | 2010122841 A1 | 10/2010 | |
| WO | 2014072818 A2 | 5/2014 | |
| WO | WO-2016207754 A1 * | 12/2016 | ......... G02B 27/0075 |

(56) References Cited

FOREIGN PATENT DOCUMENTS

| | | |
|---|---|---|
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7µm Pixels in 0.11µm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

Office Action in related CN patent application 202210343497.1, dated Sep. 26, 2023.

\* cited by examiner

REDUCED HEIGHT PENALTY FOR FOLDED CAMERA

CROSS REFERENCE TO RELATED APPLICATIONS

This application is a continuation of U.S. patent application Ser. No. 17/187,810 filed Feb. 28, 2021 (now allowed) which was a continuation of U.S. patent application Ser. No. 16/475,267 filed Jul. 1, 2019 (issued as U.S. Pat. No. 10,976,567), which was a 371 application from international patent application No. PCT/IB2018/060203, which claims priority to U.S. provisional patent applications Nos. 62/626,306 filed Feb. 5, 2018, 62/658,819 filed Apr. 17, 2018, 62/672,754 filed May 17, 2018 and 62/677,012 filed May 27, 2018, the content of which applications is incorporated herein by reference in their entirety.

FIELD

Embodiments disclosed herein relate in general to digital cameras and in particular to thin folded optics cameras.

BACKGROUND

In recent years, mobile devices such as cell-phones (and in particular smart-phones), tablets and laptops have become ubiquitous. Many of these devices include one or two compact cameras including, for example, a main rear-facing camera (i.e. a camera on the back side of the device, facing away from the user and often used for casual photography) and a secondary front-facing camera (i.e. a camera located on the front side of the device and often used for video conferencing).

Although relatively compact in nature, the design of most of these cameras is similar to the traditional structure of a digital still camera, i.e. it comprises a lens assembly (or a train of several optical elements) placed on top of an image sensor. The lens assembly (also referred to as "lens module" or simply "lens") refracts the incoming light rays and bends them to create an image of a scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions the larger the focal length and the optics height.

The assembly process of a traditional camera may include handling of a few sub-assemblies: a lens, a sensor board sub-assembly and an actuator. The lens may include a lens barrel made for example of plastic or metal and includes a few (3-7) lens elements which may be made of plastic or glass. The sensor board sub-assembly may include the image sensor, a printed circuit board (PCB) and electronics needed for the operation of the camera, as known in the art. The actuator is used to move the lens for optical needs (for example for focusing (and in particular auto focusing (AF)) and/or optical image stabilization (OIS)) and for mechanical protection of the other parts of the camera. In known art, the lens is inserted and attached (e.g. glued) to the actuator from one side, along the lens optical axis, whereas the sensor board is attached (e.g. glued) to the actuator from the opposite side along the optical axis.

"Folded camera modules" (or simply "folded cameras") are known and have been suggested for incorporation in various "host" devices (e.g. smart-phones, tablets, laptops, smart TVs, etc.). In a folded camera, an optical path folding element (OPFE) e.g. a prism or a mirror (otherwise referred to herein collectively as "reflecting element") tilts light arriving in a first optical path or direction (e.g. perpendicular to a back surface of a smart-phone) to a second optical path or direction (e.g. parallel to the smart-phone back surface). If the folded camera is part of a dual-aperture camera, this provides a folded optical path through one lens assembly (e.g. a Tele lens). Such a camera is referred to herein as "folded-lens dual-aperture camera" or "dual-aperture camera with a folded lens". In general, the folded camera may be included in a multi-aperture camera, for example together with two "non-folded" (upright) camera modules in a triple-aperture camera, or in multi-aperture cameras with more than 3 cameras.

Actuators used for AF and OIS in smart-phone cameras are known. A commonly used actuator is based on voice coil motor (VCM) technology. In VCM technology, a permanent (or "fixed") magnet and a coil are used to create actuation force. The coil is positioned in the vicinity of the magnetic field of the fixed magnet. Upon driving current in the coil, a Lorentz force is created on the coil, an in return an equal counter-force is applied on the magnet. The magnet or the coil is rigidly attached to an optical element to construct an actuating assembly. The actuating assembly is then moved by the magnetic Lorenz force. A VCM may also be referred to as "VCM engine" and an actuator including such a VCM (or VCM engine) may be referred to as to as "VCM actuator" or simply "actuator". An actuator may be partially or fully surrounded by an envelope (sometimes also referred to as "shield") having an envelope thickness.

In a folded camera with a moving lens mechanism (actuated by an actuator/VCM), at least one air gap is needed to allow movement. The envelope and other optional top and bottom elements or parts (e.g. a plate) added to protect the mechanism increase the total height of the actuator. A small height of a folded camera is important to allow a host device that includes it to be as thin as possible. The height of the camera is limited many times by the industrial design. In contrast, increasing the available height for the lens, sensor and OPFE may improve optical properties.

Envelope and other optional top and/or bottom parts add to the folded camera height. The height thus has a "penalty" that needs to be reduced.

In VCMs, in addition to the magnetic force, a mechanical rail is known to set the course of motion for the optical element. The mechanical rail keeps the motion of the lens in a desired path, as required by optical needs. One example of mechanical rail is known in the art as "spring-guided rail", in which a spring or set of springs is used to set the motion direction. A VCM that includes a spring-guided rail is referred to as a "spring-guided VCM". For example, US patent application No. 20110235196 discloses a lens element shifted in a linear spring rail to create focus. For example, international patent application PCT/IB2016/052179 discloses the incorporation and use of a spring guided VCM in a folded camera. The disclosure teaches a lens element shifted to create focus and OIS and an optical path folding element (OPFE) shifted in a rotational manner to create OIS. Also, PCT/IB2016/052179 teaches AF+OIS in a folded actuator where the actuator does not add to the folded camera height.

Another example mechanical rail is known in the art a "ball-guided rail", see e.g. U.S. Pat. No. 8,810,714. With a ball-guided rail, the lens is bound to move in the desired direction by set of balls confined in a groove (also referred to as "slit"). A VCM that includes a ball-guided rail is referred to as a "ball-guided VCM". A ball-guided VCM has several advantages over a spring-guided VCM. These include: (1) lower power consumption, because in a spring-guided VCM the magnetic force has to oppose a spring mechanical force, which does not exist in a ball-guided VCM, and (2) higher reliability in drops that may occur during the life cycle of a camera that includes the VCM. The actuation method in U.S. Pat. No. 8,810,714 is designed for an exemplary non-folded lens, where the lens optical axis is directly pointed at the object to be photographed and cannot be used in a folded camera.

There is a need for, and it would be advantageous to reduce height and length penalties in folded cameras both with respect to structures and to the design of a linear ball guided VCM.

SUMMARY

Embodiments disclosed herein relate to reduced height lens actuators (e.g. of VCM design) and folded cameras having such actuators. The term "lens" may refer to a lens assembly, comprising a train of several optical elements and a lens housing the lens elements. A lens is characterized by a fixed effective focal length (EFL), a clear aperture (CA), both of which are defined in international patent application PCT/IB2018/050988, which is incorporated herein by reference in its entirety, and a height, which is the distance along topmost and bottommost points on the lens. Lens elements may be made from plastic, glass and other materials known in the art.

The height of actuators and folded cameras is determined mainly by the lens diameter (height) and a "penalty". In this description, any height that is additional to the lens diameter is considered herein to be a "penalty". More specifically, a penalty is the sum of an upper (or top) height penalty and a lower (or bottom) height penalty, with the "upper", "lower" and "penalty" terms described in detail below.

In various embodiments, a reduced height lens actuator disclosed herein may have an envelope with a bottom opening, a top opening or both bottom and top openings. A folded camera including such as actuator has a "reduced height penalty", the reduction in height penalty brought about by the bottom opening, top opening or both bottom and top openings which allow to reduce the distance between the lens and outmost (e.g. top or bottom) surfaces of the envelope. The envelope may surround the lens actuator (e.g. be made of a sheet folded or bent around the lens actuator, or made of a few parts soldered or glued together. As mentioned, the envelope has an envelope thickness. The term "envelope thickness" refers to the thickness of the material forming the envelope (e.g. stainless steel, plastic, copper, etc.). If the envelope is made of different parts, the term "envelope thickness" refers to the thickness of each part.

In this description, an optical path-folding element (OPFE) is an optical element comprising a reflective plane, the OPFE capable of folding the light from one axis to a second axis, the two optical axes being substantially perpendicular to one another, with the reflective plane being tilted by 45 degrees relative to both optical axes.

In various embodiments, there are provided folded cameras, comprising: a movable lens positioned in an optical path between an OPFE and an image sensor, wherein the OPFE folds light from a first direction to a second direction and wherein the lens includes a lens optical axis parallel to the second direction, a lens height substantially aligned with the first direction, a first lens surface and a second lens surface diametrically opposed to the first surface, the first and second lens surfaces being in planes perpendicular to the first direction; and an envelope surrounding the lens in at least some sections and including, along the first direction, a first envelope section with a first opening positioned on a first side of the lens and a second envelope section without an opening positioned on a second, diametrically opposed side of the lens, wherein the first lens surface is distanced along the first direction from an external surface of the first envelope section by a first air gap, wherein the second lens surface is distanced along the first direction from an internal surface of the second envelope section by a second air gap, wherein the second envelope section has a second envelope section thickness and wherein the folded camera has a camera height substantially aligned with the first direction and substantially equal to a sum of the lens height, the first air gap, the second air gap and the second envelope section thickness.

In various embodiments, there are provided folded cameras, comprising: a movable lens positioned in an optical path between an optical path folding element (OPFE) and an image sensor, wherein the OPFE folds light from a first direction to a second direction and wherein the lens includes a lens optical axis parallel to the second direction, a lens height substantially aligned with the first direction, a first lens surface and a second lens surface diametrically opposed to the first surface, the first and second lens surfaces being in planes perpendicular to the first direction; and an envelope surrounding the lens and including, along the first direction, a first envelope section with a first opening positioned on a first side of the lens and a second envelope section with a second opening positioned on a second, diametrically opposed side of the lens, wherein the first lens surface is distanced along the first direction from an external surface of the first envelope section by a first air gap, wherein the second lens surface is distanced along the first direction from an external surface of the second envelope section by a second air gap, and wherein the folded camera has a camera height substantially aligned with the first direction and substantially equal to a sum of the lens height, the first air gap and the second air gap.

In some exemplary embodiments of a folded camera as above or below, each of the first and second air gaps may be in the range of 10-50 µm. In some exemplary embodiments, each of the first and second air gaps may be in the range of 10-100 µm. In some exemplary embodiments, each of the first and second air gaps may be in the range of 10-150 µm.

In some exemplary embodiments, the lens may be movable for focusing.

In some exemplary embodiments, the lens may be movable for optical image stabilization.

In some exemplary embodiments, the lens may be movable in two directions in a single plane for focusing and optical image stabilization, the single plane being perpendicular to the first direction.

In some exemplary embodiments, a folded camera as above has a height that does not exceed the lens height by more than about 600 µm. In some embodiments, the folded camera height does not exceed the lens height by more than 400 µm. In some embodiments, the folded camera height does not exceed the lens height by more than 300 µm.

In some exemplary embodiments, a folded camera as above may be included together with an upright camera in a dual-camera.

In an embodiment there is provided a folded camera, comprising: a lens actuator for moving a lens in at least one direction and including an envelope surrounding the lens in at least some sections and having an envelope thickness, the lens having a lens height and being positioned in an optical path between an optical path folding element and an image sensor and movable in the at least one direction, wherein the folded camera has a height smaller than the sum of the lens height, the size of a first air gap from the lens to the envelope, the size of a second air gap from the lens to the envelope and twice the envelope thickness.

In an embodiment there is provided a folded camera, comprising: a lens actuator for moving a lens in at least one direction and including an envelope surrounding the lens in at least some sections and having an envelope thickness, the lens having a lens height and being positioned in an optical path between an optical path folding element and an image sensor and movable in the at least one direction, wherein the folded camera has a height smaller than the sum of the lens height, the size of a first air gap from the lens to an external surface of the envelope, the size of a second air gap from the lens to the envelope and the envelope thickness.

In various embodiments, there are provided lens actuators for moving a lens, the lens having a lens optical axis parallel to a second direction and a lens height substantially aligned with a first direction that is substantially perpendicular to the second direction, the actuators comprising: an envelope surrounding the lens in at least some sections and including, along the first direction, a first envelope section with a first opening positioned on a first side of the lens and a second envelope section without an opening positioned on a second, diametrically opposed side of the lens, wherein the first lens surface is distanced along the first direction from an external surface of the first envelope section by a first air gap, wherein the second lens surface is distanced along the first direction from an internal surface of the second envelope section by a second air gap, wherein the second envelope section has a second envelope section thickness and wherein the folded camera has a camera height substantially aligned with the first direction and substantially equal to a sum of the lens height, the first air gap, the second air gap and the second envelope section thickness.

In various embodiments, there are provided lens actuators for moving a lens, the lens having a lens optical axis parallel to a second direction and a lens height substantially aligned with a first direction that is substantially perpendicular to the second direction, the actuators comprising: an envelope surrounding the lens in at least some sections and including, along the first direction, a first envelope section with a first opening positioned on a first side of the lens and a second envelope section with a second opening positioned on a second, diametrically opposed side of the lens, wherein the first lens surface is distanced along the first direction from an external surface of the first envelope section by a first air gap, wherein the second lens surface is distanced along the first direction from an external surface of the second envelope section by a second air gap, and wherein the folded camera has a camera height substantially aligned with the first direction and substantially equal to a sum of the lens height, the first air gap and the second air gap.

In some exemplary embodiments of an actuator as above or below, each of the first and second air gaps may be in the range of 10-50 µm. In some exemplary embodiments, each of the first and second air gaps may be in the range of 10-100 µm. In some exemplary embodiments, each of the first and second air gaps may be in the range of 10-150 µm.

In some exemplary embodiments, the lens may be movable for focusing.

In some exemplary embodiments, the lens may be movable for optical image stabilization.

In some exemplary embodiments, the lens may be movable in two directions in a single plane for focusing and optical image stabilization, the single plane being perpendicular to the first direction.

In some exemplary embodiments, an actuator as above or below has a height that does not exceed the lens height by more than about 600 µm. In some embodiments, the actuator height does not exceed the lens height by more than 400 µm. In some embodiments, the actuator height does not exceed the lens height by more than 300 µm.

In various embodiments, there are provided folded cameras comprising: a lens positioned in an optical path between an optical path folding element and an image sensor, the lens having a lens height and an optical axis, wherein the folded camera has a height not exceeding the lens height by more than 500 µm.

In an exemplary embodiment, the folded camera above may have a height not exceeding the lens height by more than 400 µm.

In an exemplary embodiment, the folded camera above may have a height not exceeding the lens height by more than 250 µm.

In an exemplary embodiment, the folded camera above may be included together with an upright camera in a dual-camera.

In an embodiment there is provided an actuator for actuating a lens having a lens optical axis for AF and optical image stabilization OIS, the actuator comprising: a stationary sub-assembly that includes an OIS coil having an OIS coil plane and an AF coil having an AF coil plane; and a lens actuating sub-assembly movable relative to the stationary sub-assembly and including a lens holder holding the lens, wherein the OIS coil plane is perpendicular to AF coil plane and wherein the lens optical axis lies between the OIS coil plane and the AF coil plane.

In an exemplary embodiment, the stationary sub-assembly further includes a plurality of upper stepping yokes, wherein the lens actuating sub-assembly further includes a plurality of stepping magnets coupled to the plurality of upper stepping yokes, and wherein the plurality of stepping yokes and the plurality of stepping magnets are operable to create stepping forces in a direction perpendicular to the lens optical axis for stepping.

In some exemplary embodiments, an actuator as above or below further comprises a middle actuating sub-assembly for AF and OIS positioned between the stationary sub-assembly and the lens top actuating sub-assembly.

In some exemplary embodiments, the stationary sub-assembly further includes an OIS Hall sensor bar used in conjunction with one of the stepping magnets to perform position sensing.

In some exemplary embodiments, some yokes of the plurality of stepping yokes are positioned on a first surface, wherein other yokes of the plurality of stepping yokes are positioned on a second surface, and wherein the first and second surfaces are parallel.

In some exemplary embodiments, an actuator as above may be included in a folded camera.

In various embodiments, there are provided folded cameras comprising: a lens having a lens optical axis, an optical path folding element for folding light from a first direction to a second direction, the second direction being essentially aligned with the lens optical axis, an image sensor and an actuator for actuating the lens for AF and OIS, the actuator comprising an AF VCM that includes an AF coil positioned in an AF plane and is operable to move the lens in an AF direction, and an OIS VCM that includes an OIS coil positioned in an OIS plane and is operable to move the lens in an OIS direction, wherein the AF plane and the OIS plane are perpendicular to each other, and wherein the two VCMs are located on opposite sides of a plane defined by the first and second directions.

BRIEF DESCRIPTION OF THE DRAWINGS

Non-limiting examples of embodiments disclosed herein are described below with reference to FIGURES attached hereto that are listed following this paragraph. Identical structures, elements or parts that appear in more than one FIGURE are generally labeled with a same numeral in all the FIGURES in which they appear. The drawings and descriptions are meant to illuminate and clarify embodiments disclosed herein and should not be considered limiting in any way. In the drawings.

DETAILED DESCRIPTION

Figure 1A:
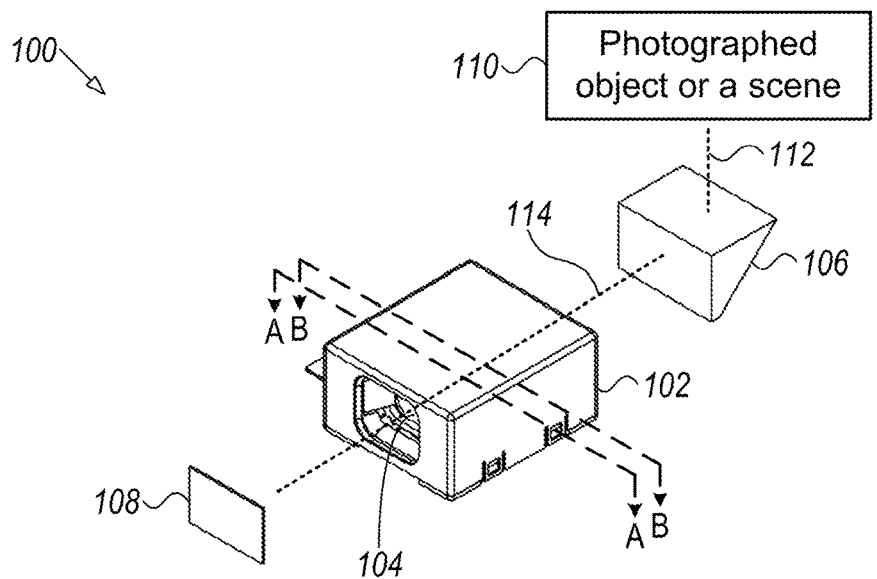
FIG. 1A shows an embodiment of a folded camera disclosed herein.

FIG. 1A shows an embodiment of a folded camera numbered 100. Folded camera 100 comprises a lens actuator 102 carrying a lens 104, an OPFE (e.g. a prism, a mirror, etc.) 106 and an image sensor 108. Camera 100 may be used to image a photographed object or a scene 110. In an example, light coming from the direction of object or scene 110 along a first direction (also referred to as "entrance optical axis") 112 enters OPFE 106, is folded to a second direction (also referred to as "lens optical axis") 114, enters lens actuator 102 and then arrives at image sensor 108. Lens 104 may comprise several lens elements, which may be held in one lens barrel or in a plurality of lens barrels. Lens 104 may have a fixed focal length or a changing (variable) focal length ("zoom lens"). Lens 104 may be shifted (actuated) for example for the purposes of focus (or auto focus—AF) or optical image stabilization (OIS). The actuation of lens 104 dictates that an air gap should be kept between the lens and other stationary parts such as an envelope 122 (see FIG. 1B). Folded camera 100 may include other parts such as an actuation mechanism for OPFE 106 (as in PCT/IB2017/052383), a housing (not shown for simplicity) for image sensor 108 to prevent stray light and mechanical damages, and other components known in the art, not shown for simplicity. More details on the operation of such a folded camera may be found in co-owned patent applications PCT/IB2015/056004, PCT/IB2016/052179 and PCT/IB2017/058403, which are all incorporated herein by reference.

Figure 1B:
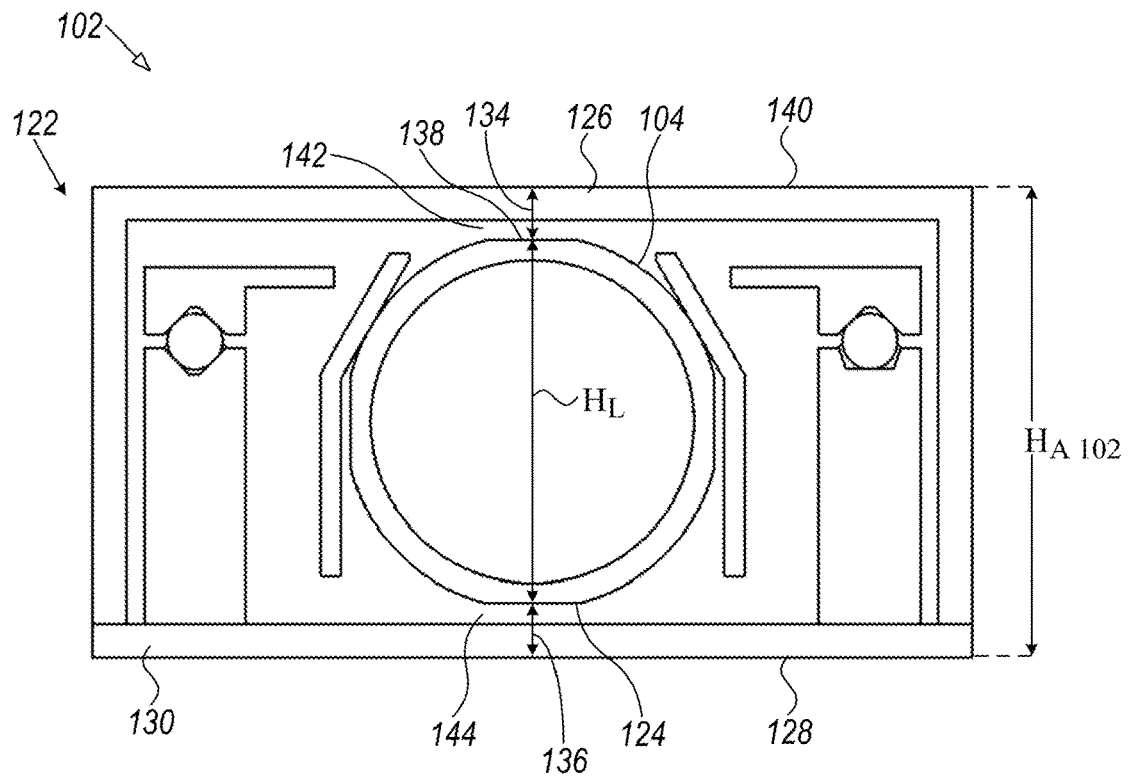
FIG. 1B shows a cross section along cuts A-A and B-B of the folded camera of FIG. 1A.

FIG. 1B shows a cross section of lens actuator 102 along a cut A-A to B-B seen in FIG. 1A. Lens actuator 102 has an actuator height $H_A$ 102 between an external surface 140 of a top (upper) section (or "side") 126 of envelope 122 and an external surface 128 of a bottom (lower) section 130 of envelope 122. The top and bottom envelope sections may be planar members with surfaces perpendicular to first direction 112 (i.e. with a plane normal aligned with first direction 112). As used herein, the terms "top" or "upper" refer to a side of the lens actuator (and of the folded camera) that is closer to and facing object or scene 110 along Y, while "bottom", "below" or "lower" refers to a side of the lens actuator (and of the folded camera) that is farthest and facing away from the imaged object or scene along Y. Height $H_{A\ 102}$ is measured along the Y axis, or parallel to the first optical axis 112, as described below. As used herein, "height", "part height", "module height", "actuator height" or "camera height", refer to a dimension of the respective object along the Y axis, namely along an axis perpendicular to lens optical axis 114 and parallel to entrance optical axis 112 facing the object.

Actuator height $H_{A\ 102}$ is a sum of a lens height $H_L$ of lens 104, an upper height penalty 134 and a lower height penalty 136. Upper height penalty 134 is defined as the distance between a topmost surface 138 of the lens and external top surface 140. Lower height penalty 136 is defined as the distance between a lowest (bottom) surface 124 of the lens and external bottom surface 128. In other words, upper height penalty 134 is the sum of the thickness of upper envelope section 126 and the size of an upper air gap 142 required between lens 104 and upper envelope section 126 (e.g. to allow actuation and movement of the lens for AF and/or OIS). Lower height penalty 136 is the sum of the thickness of lower envelope section 130 and the size of a lower air gap 144 needed between lens 104 and lower envelope section 130 e.g. to allow actuation and movement of the lens for AF and/or OIS). In turn, height $H_{A\ 102}$ is the sum of the largest dimension of the lens in the Y direction (i.e. $H_L$) plus necessary air gaps 142 and 144 plus the thicknesses of the upper and lower envelope sections 126 and 130. In other words, lens actuator height $H_{A\ 102}$ is the largest dimension of actuator 120 along the Y direction.

Figure 1C:
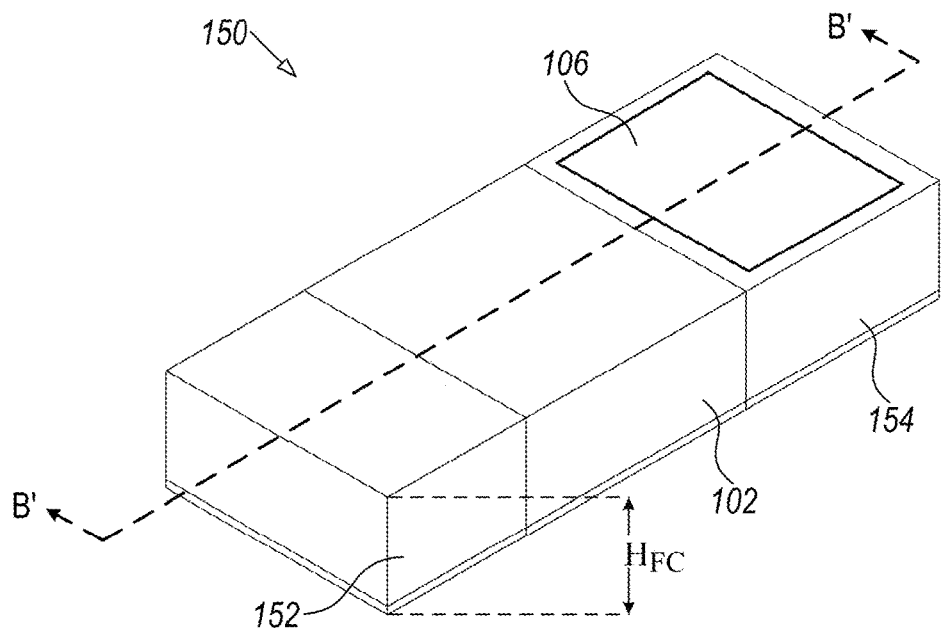
FIG. 1C shows another folded camera disclosed herein.
Figure 1D:
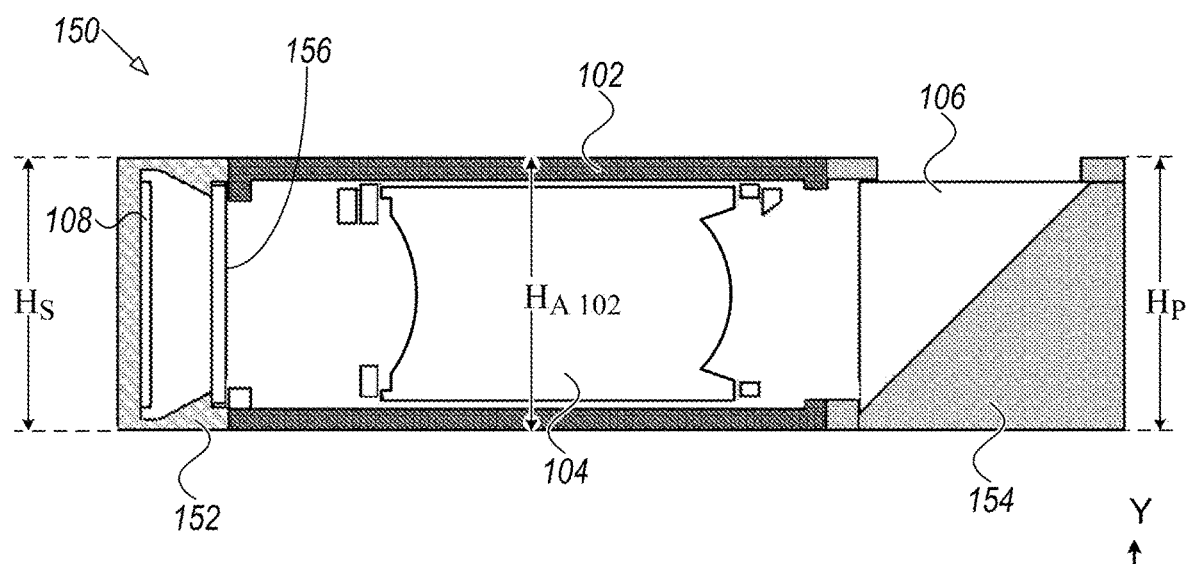
FIG. 1D shows a side cut along a line B'-B' of the folded camera in FIG. 1C.

FIG. 1C shows another folded camera 150, similar to camera 100. Camera 150 includes a lens actuator section with lens actuator 102 holding the lens, an image sensor holder section 152 that includes the image sensor and has a height $H_S$, and a prism holder section 154 that includes OPFE 106 and has a height $H_P$. Additionally, an infra-red (IR) filter 156 may be positioned between lens 104 and image sensor 108, FIG. 1D. FIG. 1D shows a side cut of camera 150 along a line B'-B' seen in FIG. 1C. In camera 150, a folded camera height $H_{FC}$ is limited by the maximum value of $H_P$, $H_S$ and $H_{A\ 102}$. Thus $H_{FC}$ may be limited by lens actuator height $H_{A\ 102}$, and a reduction in $H_{A\ 102}$ may lead to a reduction of $H_{FC}$. In other words, the folded camera height may be determined by (and may be equal to) the lens actuator height.

Figure 2A:
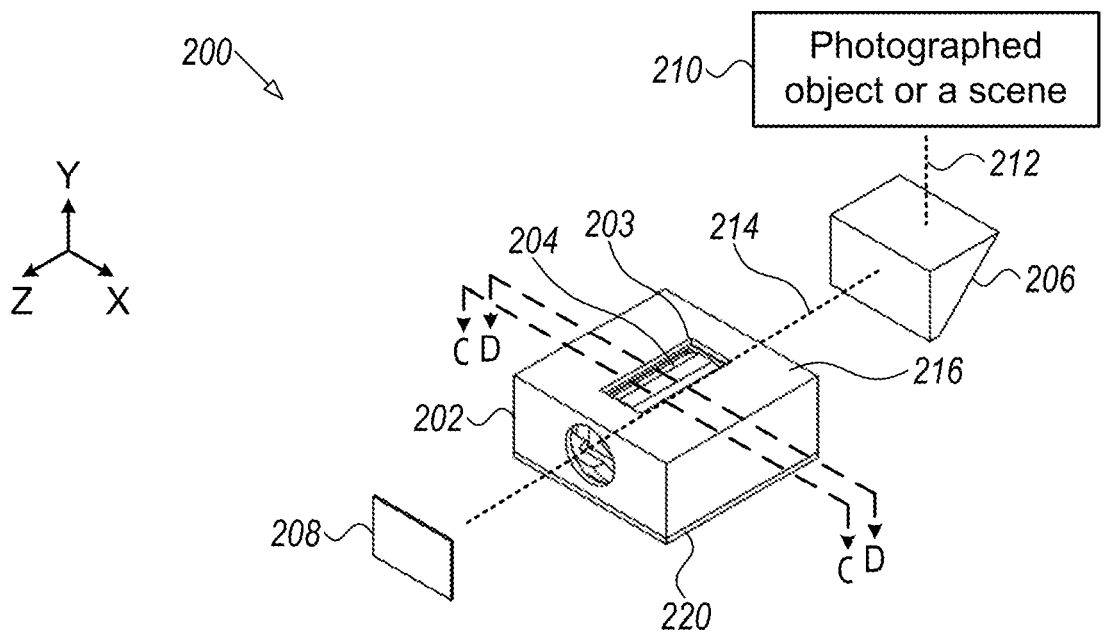
FIG. 2A shows schematically the elements of a folded camera disclosed herein.

FIG. 2A shows schematically the elements of a folded camera disclosed herein and numbered 200 in an exemplary coordinate system XYZ. Folded camera 200 includes a reduced height lens actuator 202 having a top opening 203, a lens 204, an OPFE 206 and an image sensor 208, see also FIGS. 2-9.

OPFE 206 folds light arriving from an object or scene 210 along a first direction (entrance optical axis) 212 parallel to the Y direction, to a second direction (lens optical axis) 214 parallel to the Z direction toward image sensor 208.

Figure 2B:
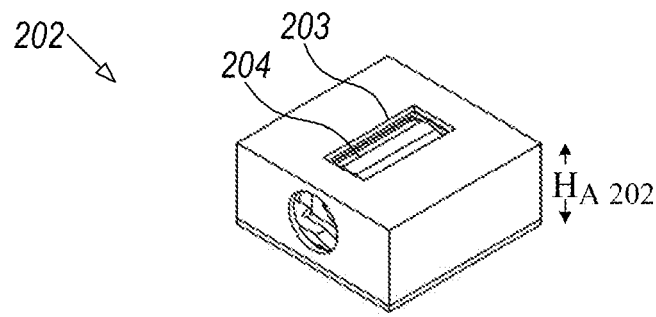
FIG. 2B shows an embodiment of a reduced height folded lens actuator with a bottom opening disclosed herein in a top perspective view.
Figure 2C:
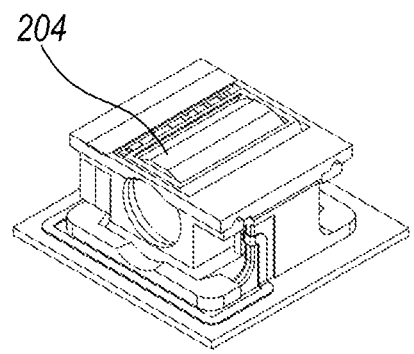
FIG. 2C shows the actuator embodiment of FIG. 2B without an upper envelope from a top perspective view.
Figure 2D:
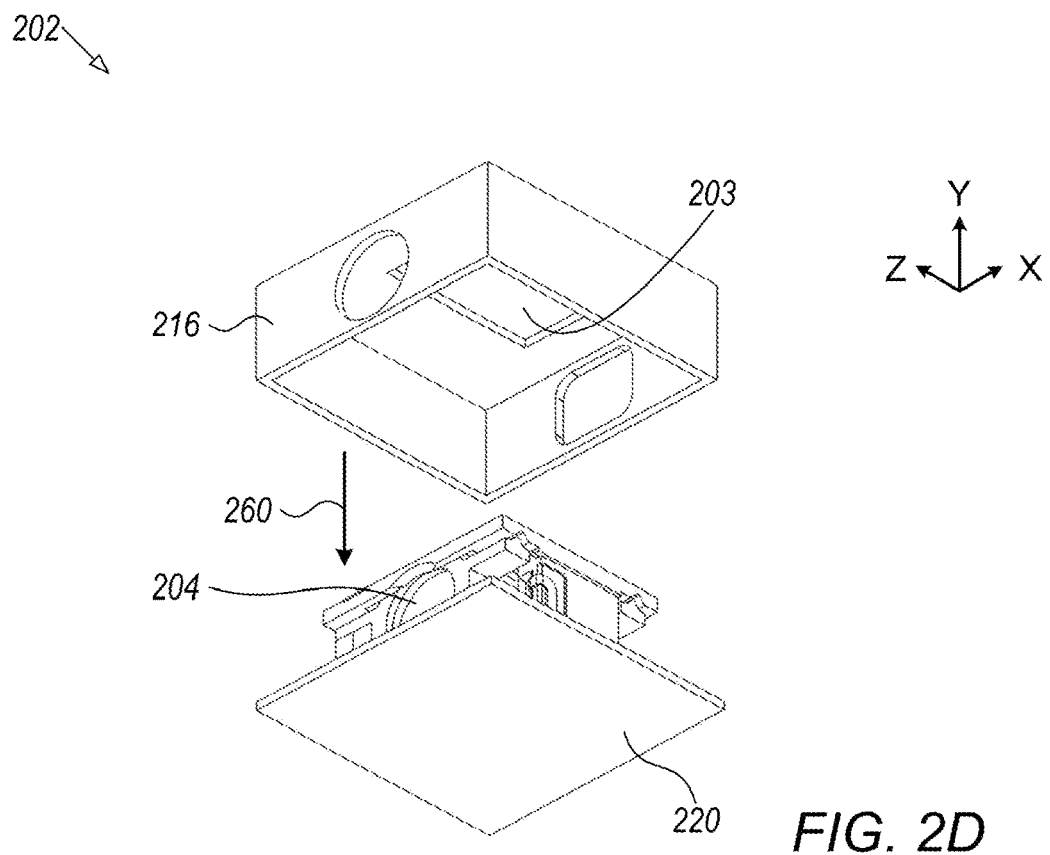
FIG. 2D shows the actuator embodiment of FIG. 2B from a bottom perspective view.
Figure 2E:
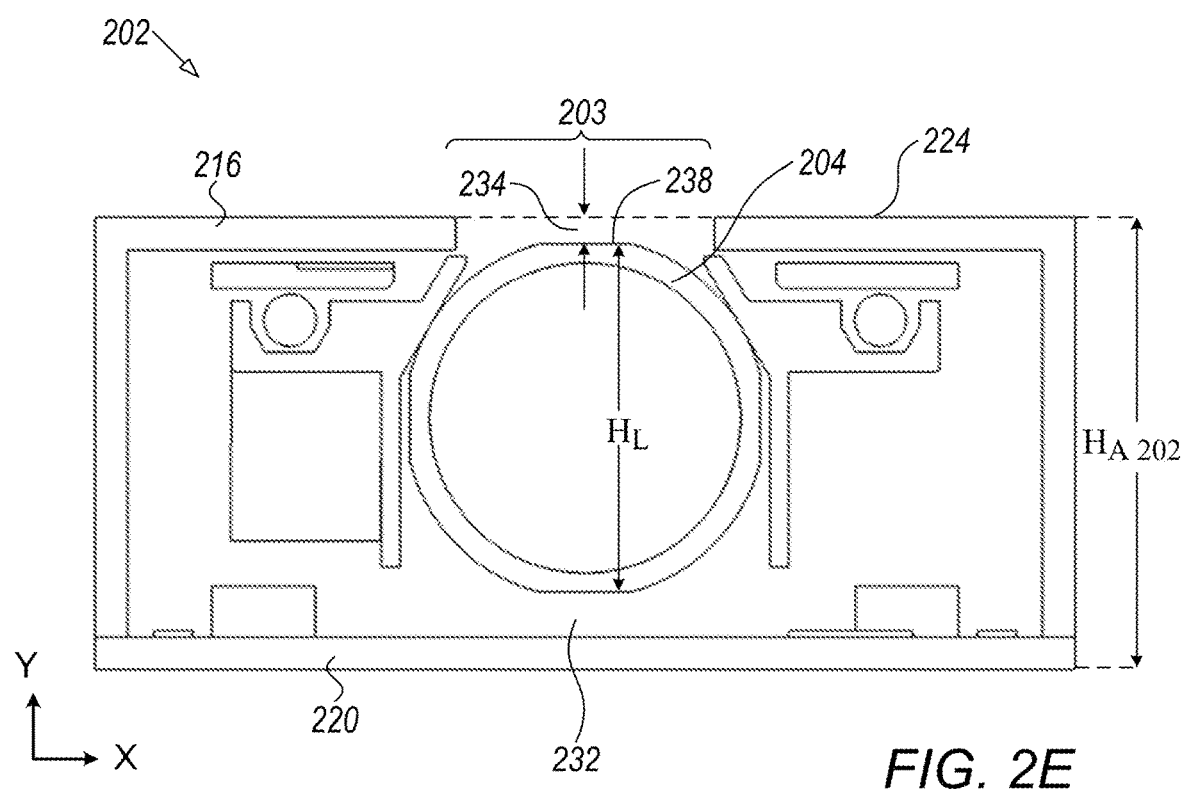
FIG. 2E shows the actuator embodiment of FIG. 2B in a front section view along sections between sections C-C and D-D.

FIGS. 2B-2E provide various views of lens actuator 202. FIG. 2B shows lens actuator 202 in a top perspective view, FIG. 2C shows lens actuator 202 without an upper envelope section 216 from a top perspective view. FIG. 2D shows lens actuator 202 with a separated upper envelope section 216 from a bottom perspective view. Arrow 260 shows the direction from which upper envelope section 216 is installed. FIG. 2E shows lens actuator 202 in a section view between sections C-C and D-D in FIG. 2A. Top opening 203 allows for an upper height penalty 234 smaller than upper height penalty 134 in lens actuator 102. Upper height penalty (air-gap) 234 is measured between lens top surface 238 and an external top surface 224 of the upper envelope section 216. Upper height penalty (air-gap) 234 is equal to the size of the air-gap between lens top surface 238 and an external top surface 224 measured along the first direction (Y axis). A second air gap 232 is positioned on the diametrically opposed side of lens 204 relative to air gap 234. Air gap 232 is between lens 204 and an internal surface 236 of bottom envelope section 220, and allows the motion of lens 204 relative to bottom envelope section 220. In some examples, $H_{A\ 202}$ is equal to the lens height $H_L$ plus the size of two air-gaps 234 and 232 plus the thickness of a bottom envelope section 220. Exemplarily, the size of air-gap 234 and/or 232 can be 50-150 μm, the thickness of bottom envelope section 220 is 100-150 μm, and lens actuator height $H_{A\ 202}$ can be equal to $H_L$ plus 250 μm-500 μm. All other dimensions being equal, a lens actuator height $H_{A\ 202}$ in folded camera 200 will be smaller than lens actuator height $H_{A\ 102}$ in folded camera 100.

Figure 2F:
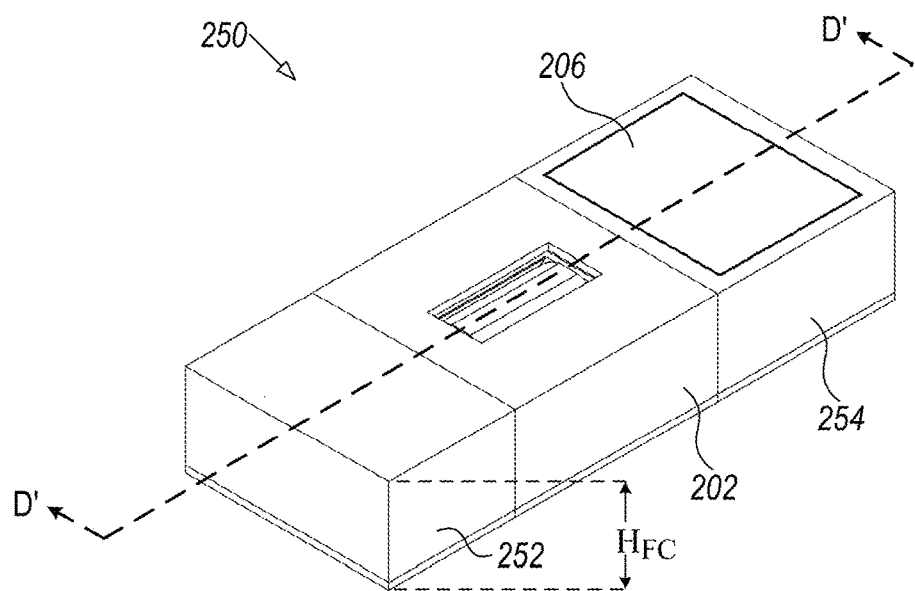
FIG. 2F shows an embodiment of a reduced height folded camera that includes a lens actuator as in FIGS. 2B-2E.
Figure 2G:
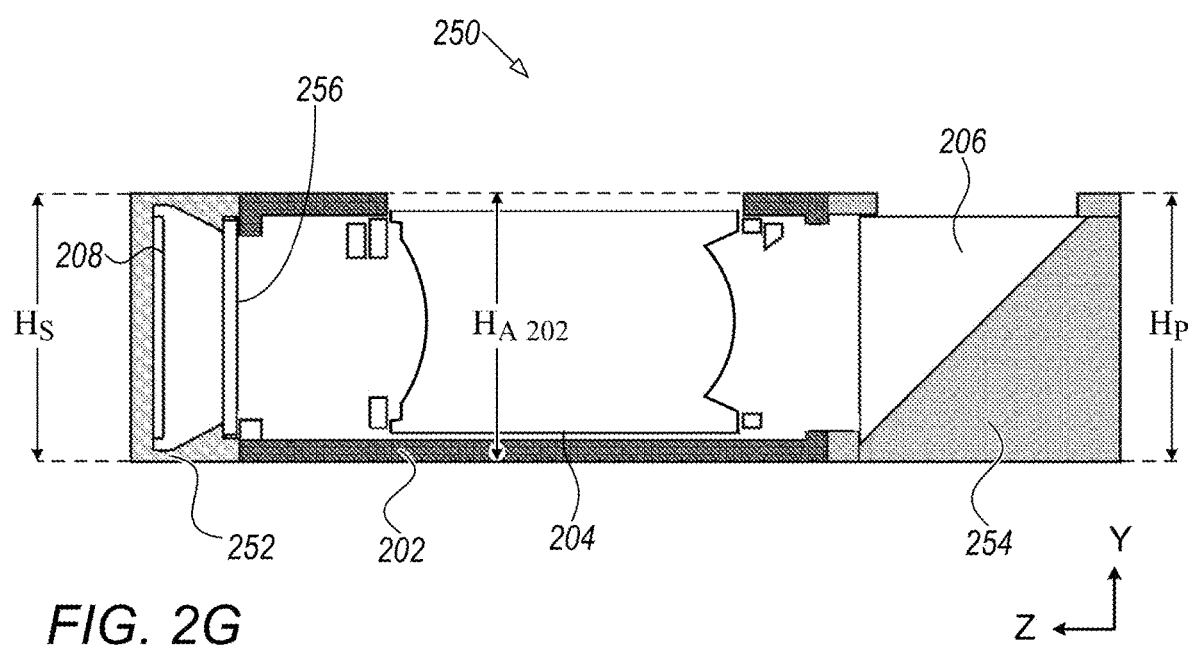
FIG. 2G shows a side cut along a cut D'-D' of the folded camera embodiment of FIG. 2F.

FIG. 2F shows another embodiment of a folded camera disclosed herein and numbered 250, similar to folded camera 200. Camera 250 includes lens actuator 202 with lens actuator height $H_{A\ 202}$ and carrying lens 204. Image sensor 208 is held in an image sensor holder 252. An OPFE 206 is held in a prism holder 254. Additionally, in some embodiments, an IR filter 256 is optionally positioned between lens 204 and image sensor 208. FIG. 2G shows a side cut of camera 250 along a line D'-D' seen in FIG. 2F. In camera 250, folded camera height $H_{FC}$ is limited by the maximum of $H_{A\ 202}$, $H_P$ and $H_S$. Thus, a reduction $H_{A\ 202}$ may lead to a reduction of $H_{FC}$.

Alternatively, for a given folded camera height, a higher lens (i.e. a lens with large $H_L$) with better optical properties can be used in a design with an opening, relative to a design with no opening. Evidently, the design of camera 250 has an advantage over the design of camera 150 by either having a lower camera height for the same optics, or by having better optics for the same camera height.

Figure 3A:
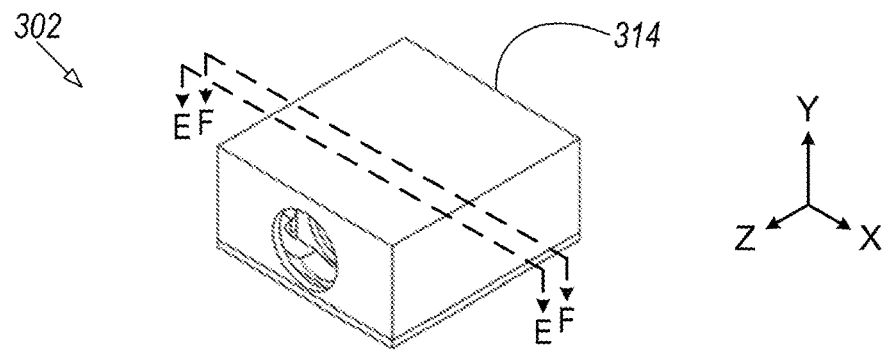
FIG. 3A shows an embodiment of a reduced height folded lens actuator with a top opening disclosed herein in a top perspective view.
Figure 3B:
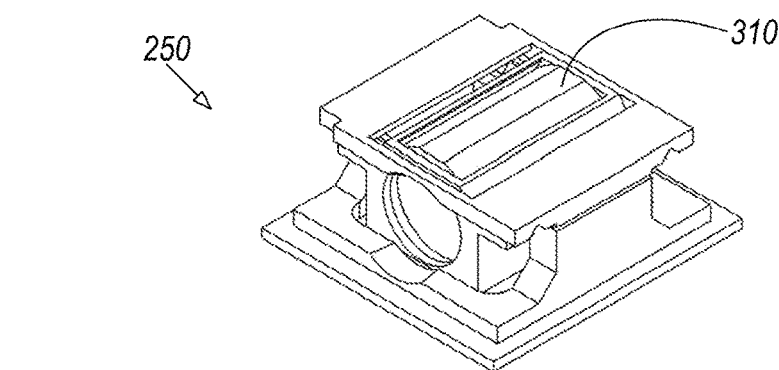
FIG. 3B shows the actuator embodiment of FIG. 3A without an upper envelope from a top perspective view.
Figure 3C:
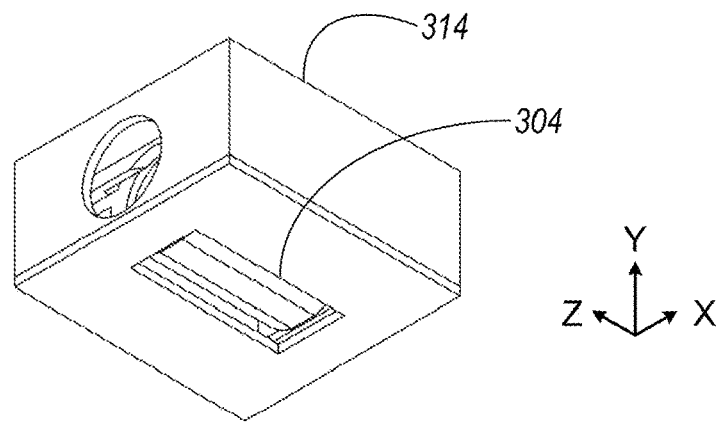
FIG. 3C shows the actuator embodiment of FIG. 3A from a bottom perspective view.
Figure 3D:
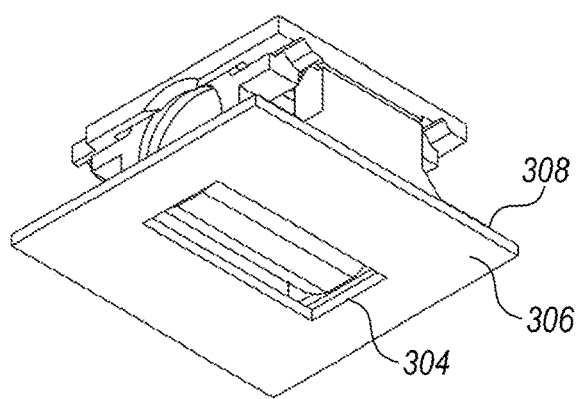
FIG. 3D shows the actuator embodiment of FIG. 3B from a bottom perspective view.
Figure 3E:
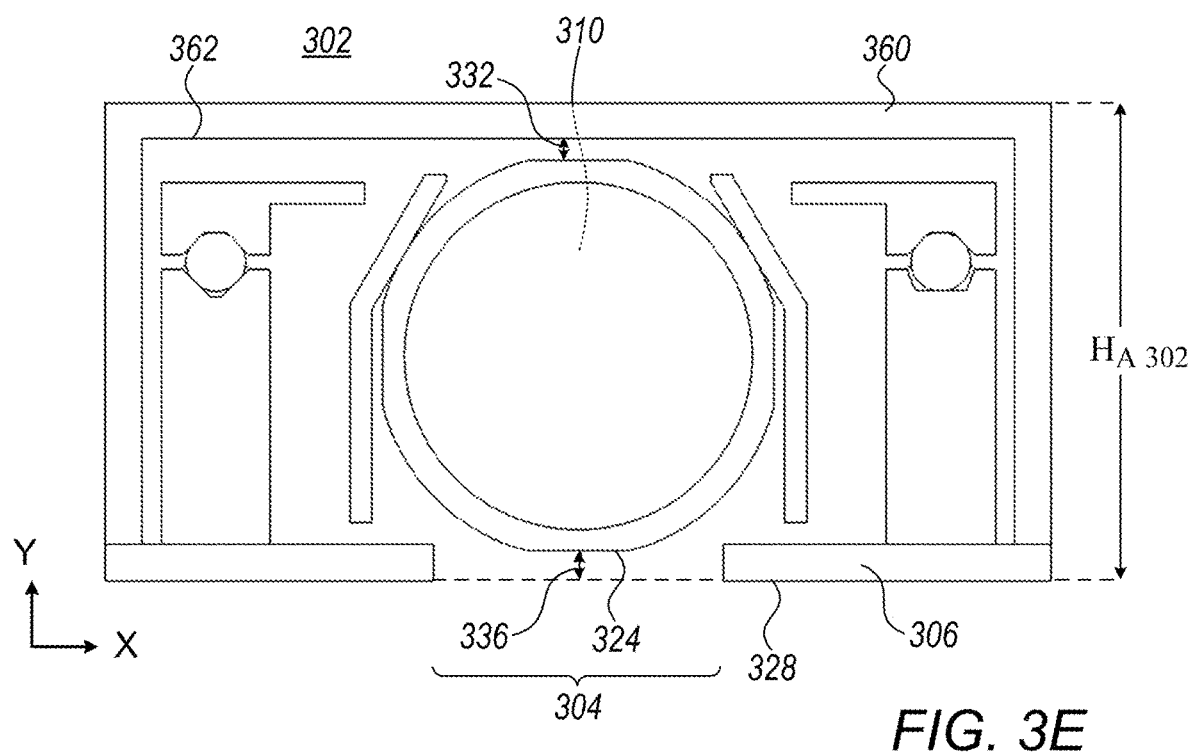
FIG. 3E shows the actuator embodiment of FIGS. 3A-3D in a front section view along sections between sections A-A and B-B in FIG. 3A.

FIGS. 3A-3E provide various views of a second embodiment of a lens actuator numbered 302, in which the lens actuator envelope 314 has a bottom opening 304 in a bottom lid 306. Lens actuator 302 is similar to lens actuator 202 and can be installed in a folded camera such as folded camera 200 in a similar manner. FIG. 3A shows lens actuator 302 actuating lens 310 in a top perspective view, FIG. 3B shows lens actuator 302 without an upper envelope section from a top perspective view. FIG. 3C shows lens actuator 302 from a bottom perspective view. FIG. 3D shows lens actuator 302 without an upper envelope section from a bottom perspective view, and FIG. 3E shows lens actuator 302 in a section view between sections E-E and F-F in FIG. 3A. Bottom opening 304 allows for a lower height penalty (air-gap) 336 and equal to the air-gap between a bottom surface 324 of the lens and an external bottom surface 328 of a bottom envelope section 306 measured along the first direction (Y axis). That is, lower height penalty 336 is smaller than lower height penalty 136 in FIG. 1. A second air gap 332 is positioned on the diametrically opposed side of lens 310 relative to air gap 336. An air gap 232 is between lens 310 and the internal surface 362 of upper envelope section 360, and allows the motion of lens 310 relative to upper envelope section 360. In some examples, $H_{A\ 302}$ is equal to $H_L$ plus the size of the two air-gaps 332 and 336, plus the thickness of upper envelope section 360. Exemplarily, the height of each of air-gaps 332 and 336 can be 50-150 µm, the thickness of upper envelope section 360 can be 100-150 µm, and $H_{A\ 302}$ can be equal to the lens height $H_L$ plus 250 µm-500 µm. All other dimensions being equal, a lens actuator height $H_{A\ 302}$ of camera 300 will be smaller than lens actuator height $H_{A\ 102}$ in camera 100. Like lens actuator 202, lens actuator 302 may be combined in a folded camera between an OPFE and an image sensor, such that the height of the folded camera $H_{FC}$ may be equal to the height of the lens actuator $H_{A\ 302}$.

Figure 4A:
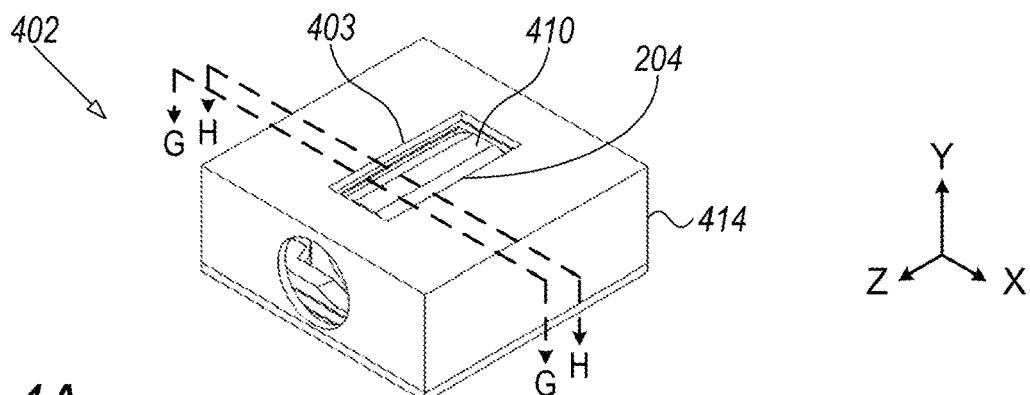
FIG. 4A shows an embodiment of a reduced height folded lens actuator with a top opening and a bottom opening disclosed herein in a top perspective view.
Figure 4B:
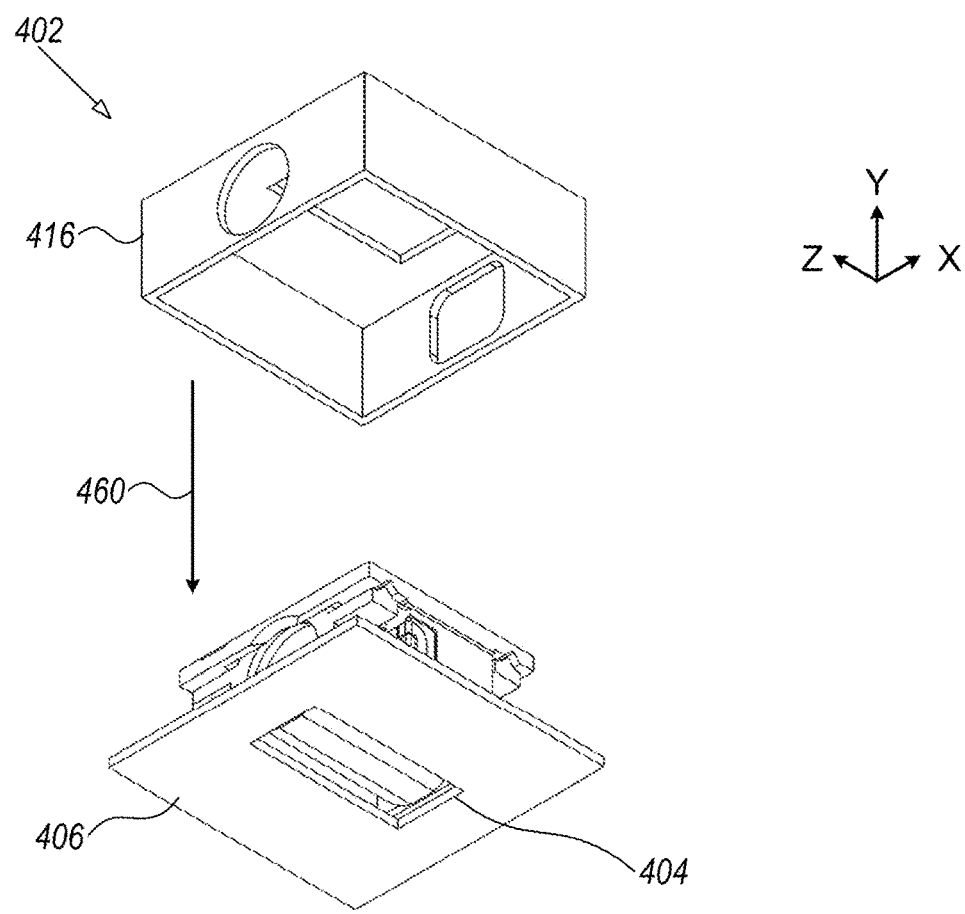
FIG. 4B shows the actuator embodiment of FIG. 4A with a separated upper envelope from a bottom perspective view.
Figure 4C:
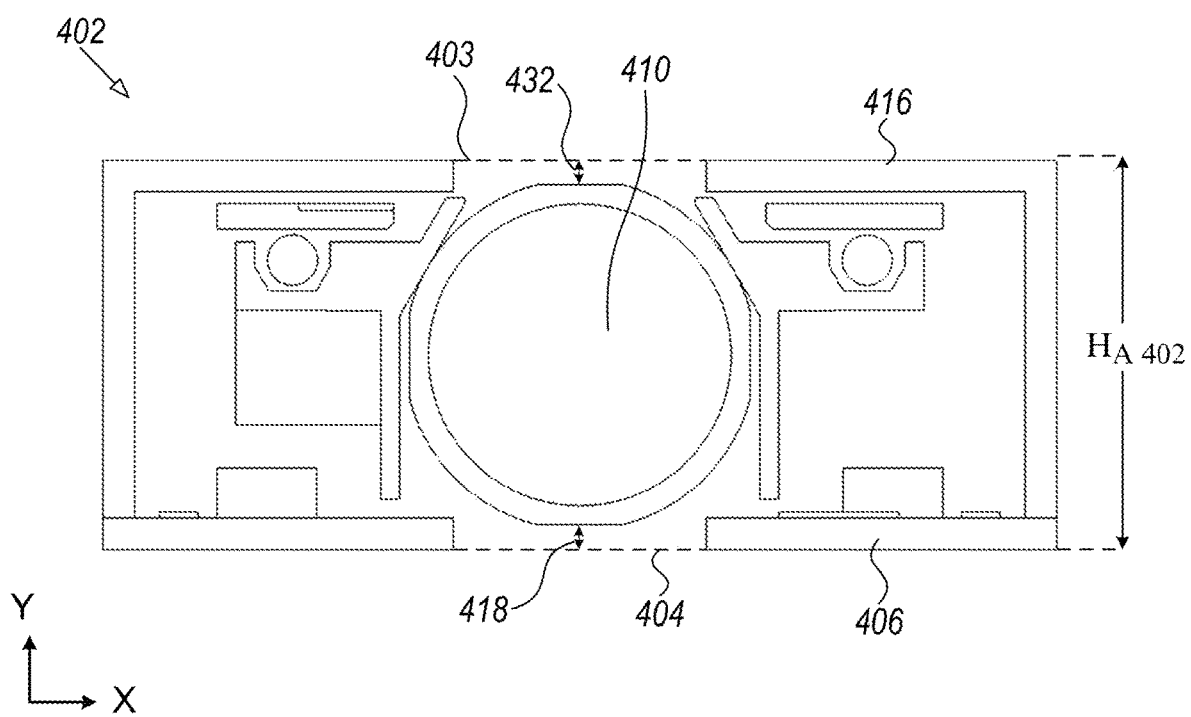
FIG. 4C shows the actuator embodiment of FIG. 4A in a section view between sections H-H and G-G in FIG. 4A.

FIGS. 4A-4C provide various views of a third embodiment of a folded lens actuator numbered 402 actuating a lens 410, in which a lens actuator envelope 414 has both a bottom opening and a top opening. FIG. 4A shows lens actuator 402 in a top perspective view, FIG. 4B shows lens actuator 402 with a separated upper envelope section 416 from a bottom perspective view, and FIG. 4C shows lens actuator 402 in a section view between sections G-G and H-H in FIG. 4A. Arrow 460 shows the direction from which upper envelope section 216 is installed. Lens actuator 402 includes upper envelope section 416 with an opening 403 like opening 203 in lens actuator 202 and a bottom envelope section 406 with an opening 404 like opening 304 in lens actuator 302. The two openings 403 and 404 are positioned on diametrically opposed sides of lens 410. Thus, lens actuator 402 combines the advantages provided by top opening 203 of lens actuator 202 and bottom opening 304 of lens actuator 302, with a final lens actuator height $H_{A\ 402}$ smaller than the lens actuator heights in actuators 102, 202 and 302. In some examples, lens actuator height $H_{A\ 402}$ is equal to the lens height plus the size of two air-gaps 418 and 432. Exemplarily, the size of each of the air-gaps 418 and 432 can be 50-150 µm and lens actuator height $H_{A\ 402}$ can be equal to $H_L$ plus 100 µm or 250 µm or 300 µm. Like lens actuator 202, lens actuator 402 may be combined in a folded camera between an OPFE and an image sensor, such that the height of the folded camera $H_{FC}$ may be equal to the height of the lens actuator $H_A$, 402.

FIGS. 5A, 5B, 6, 7, 8 and 9 show one exemplary lens actuator design using VCM actuation. Such a design may be used in conjunction with envelope designs of lens actuators 202, 302 and 402.

Figure 5A:
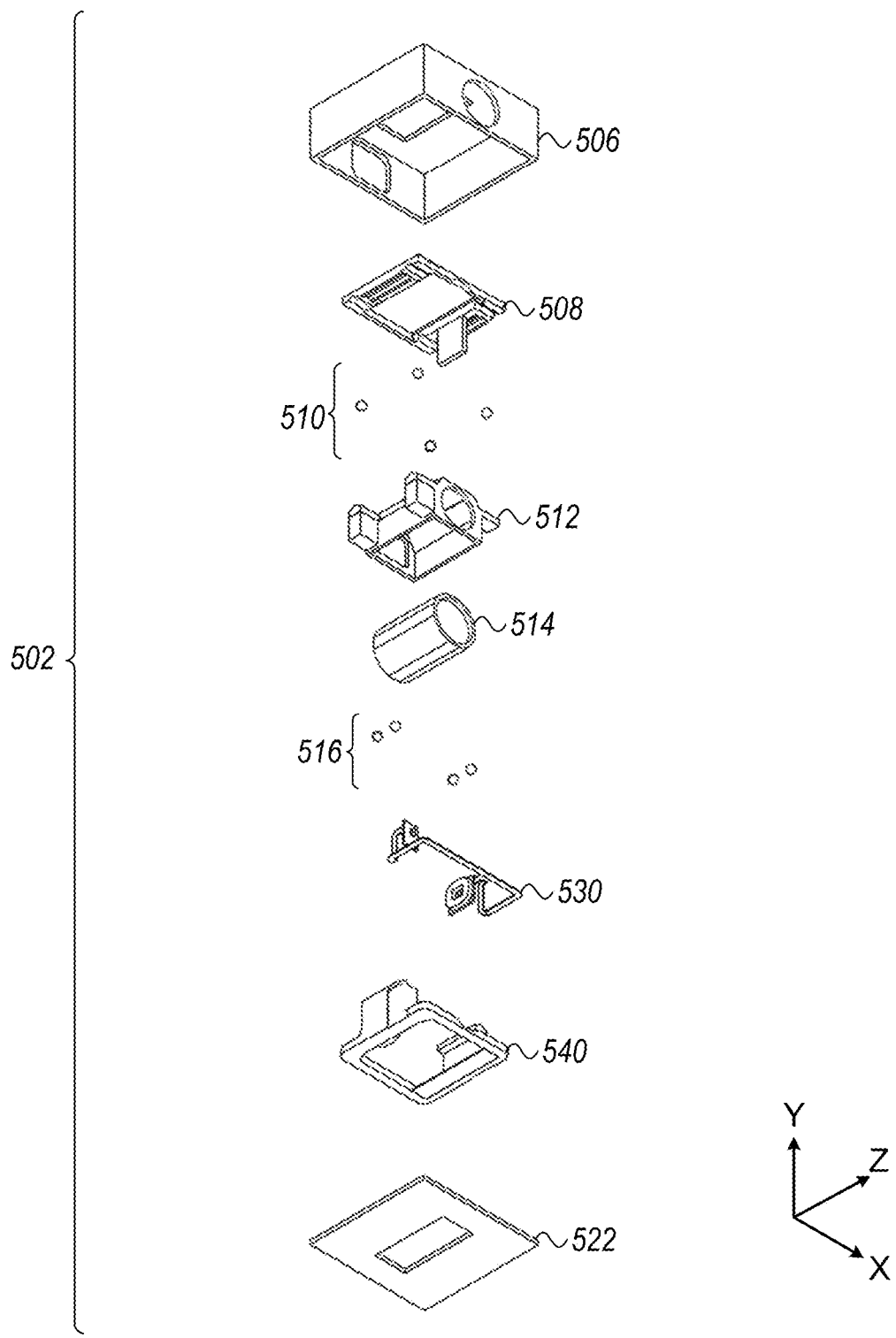
FIG. 5A shows an exploded view of the reduced height folded lens actuator of FIGS. 4A-C.
Figure 5B:
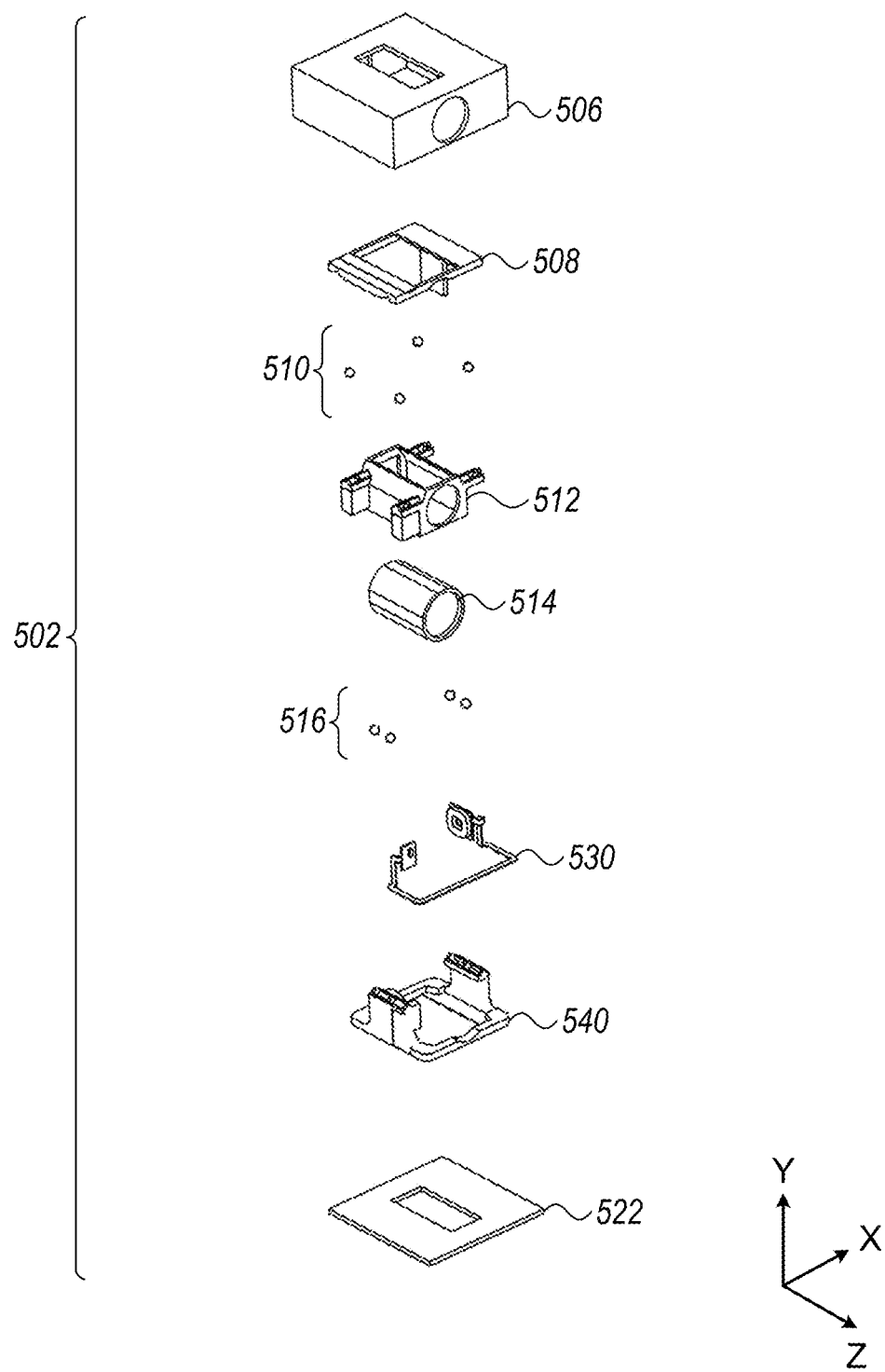
FIG. 5B shows another exploded view of the reduced height folded lens actuator of FIGS. 4A-C.

FIG. 5A and FIG. 5B show, respectively, exploded bottom and top perspective views of a VCM 502. VCM 502 comprises an envelope 506, an OIS/AF plate sub-assembly 508, four upper balls 510, a lens carrier sub-assembly 512, lens 514, four lower balls 516, an electronic sub-assembly 530, a base sub-assembly 540 and a lower plate 522. VCM 502 is capable of actuating any of the lenses above in two orthogonal directions, for example for focusing and optical image stabilization.

Figure 6:
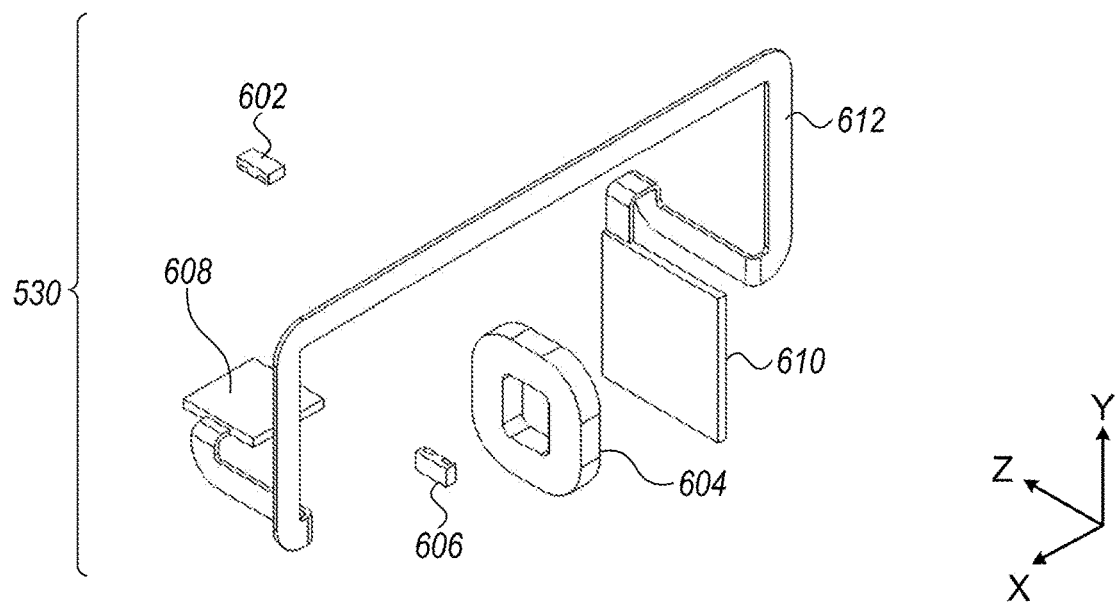
FIG. 6 shows an exploded view of an electronic sub-assembly in a reduced height folded lens actuator disclosed herein.

FIG. 6 shows an exploded view of electronic sub-assembly 530. Electronic sub-assembly 530 comprises an OIS Hall bar sensor 602, an OIS coil 604, an AF Hall bar sensor 606, a first rigid printed board circuit (PCB) 608, a second rigid PCB 610 and a flex PCB 612. The control of the motion of any of the lenses above or below can be done in close loop mode using the position sensing allowed by Hall bar sensors 602 and 606.

Figure 7:
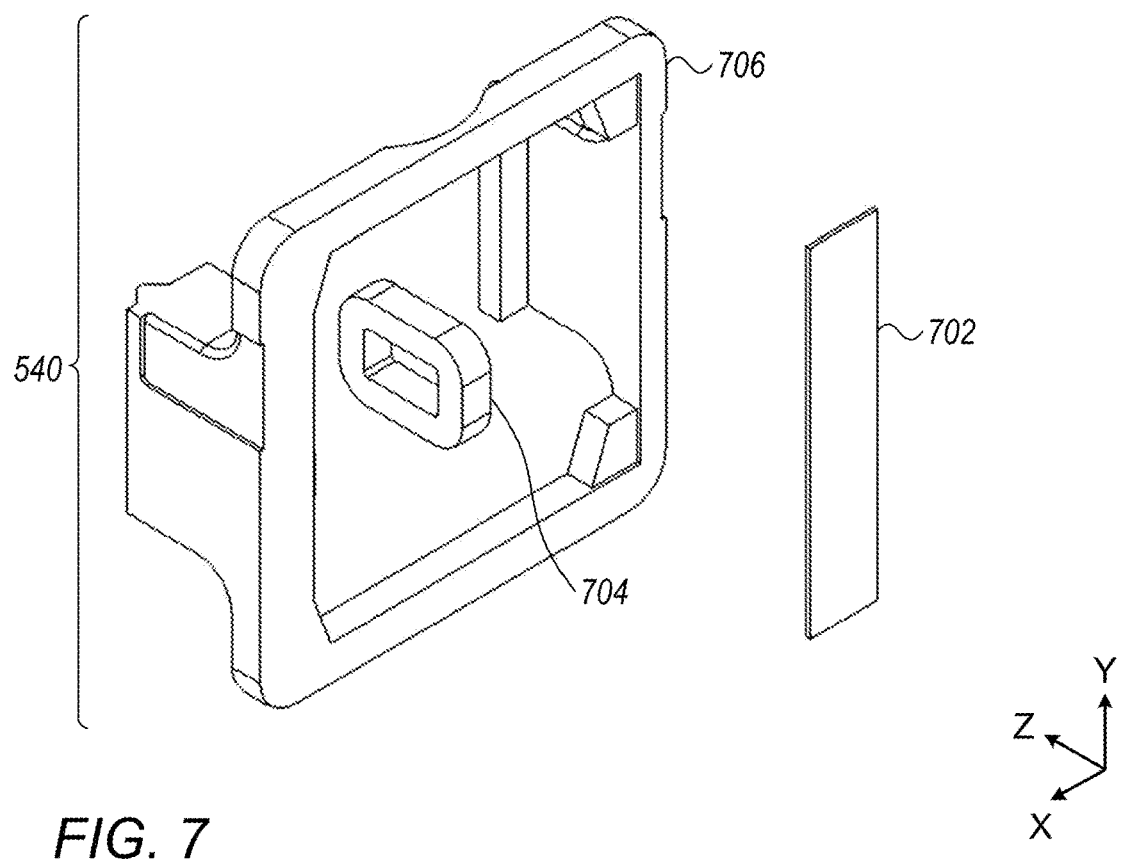
FIG. 7 shows an exploded view of a base sub-assembly in a reduced height folded lens actuator disclosed herein.

FIG. 7 shows an exploded view of base sub-assembly 540. Base sub-assembly 540 comprises an AF VCM 704, an AF stepping yoke 702 and a base 706.

Figure 8:
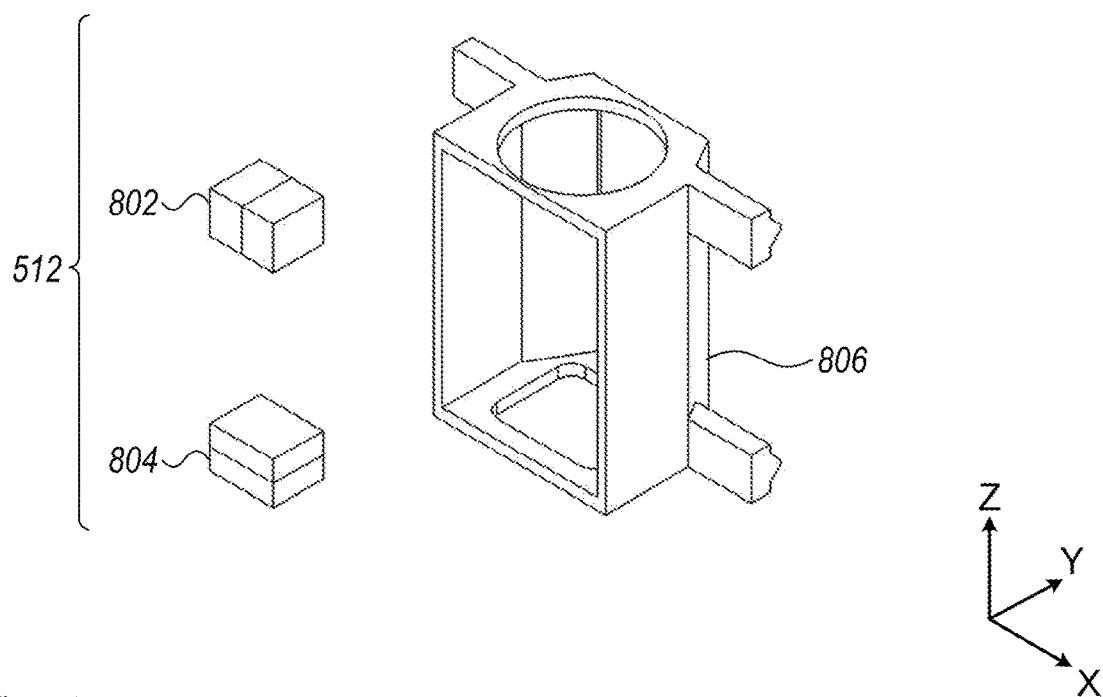
FIG. 8 shows an exploded view of a lens sub-assembly in a reduced height folded lens actuator disclosed herein.

FIG. 8 shows an exploded view of lens carrier sub-assembly 512. Lens carrier sub-assembly 512 comprises an OIS VCM magnet 804, an OIS sensing magnet 802 and a lens carrier 806.

Figure 9:
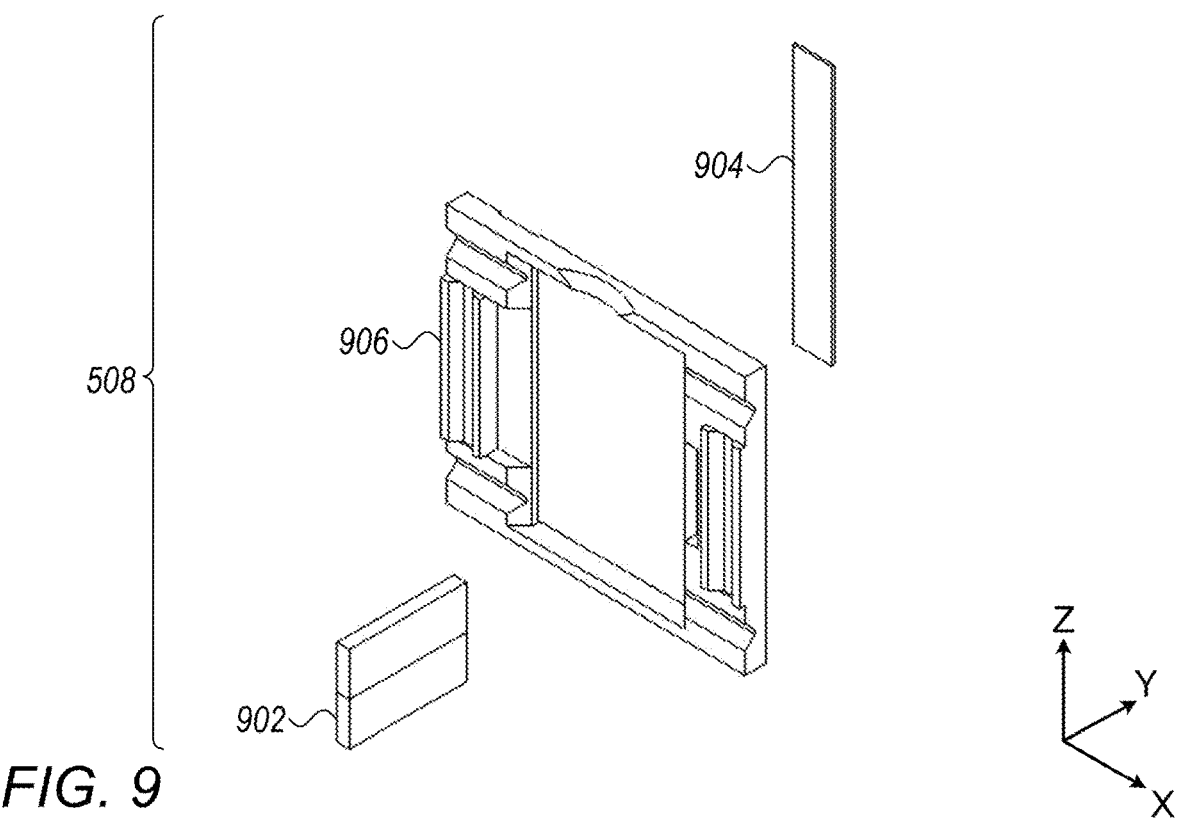
FIG. 9 shows an exploded view of an OIS/AF plate sub-assembly in a reduced height lens actuator disclosed herein.

FIG. 9 shows an exploded view of OIS/AF plate sub-assembly 508. OIS/AF plate sub-assembly 408 comprises an AF motor magnet 902, an OIS stepping yoke 904 and an OIS/AF plate 906.

FIGS. 10-14 show another exemplary lens actuator design using VCM actuation. FIG. 10A shows an exploded view of a lens actuator 1004 using VCM actuation according to some aspects of presently disclosed subject matter, lens actuator 1004 comprises an envelope 1014 serving as protection for the lens and other mechanical parts, a lens 1016 with a lens optical axis 1012, a lens carrier (holder) 1018, a plurality (e.g. four) of stepping magnets 1020a, b, c and d, an OIS magnet 1022, four upper balls 1024, an AF magnet 1026, a middle chassis 1028, four lower balls 1030, a base 1032, a plurality (e.g. four) of upper stepping yokes 1034a, b, c and d, an AF Hall sensor bar 1036, an AF coil 1038, an OIS coil 1040, a PCB 1042 serving as platform for placement of electrical components and electrical linkage between these electrical components, and OIS Hall sensor bar 1044 and a lower plate 1048 serving as bottom mechanical protection for the camera. In some embodiments, some of the stepping yokes may positioned on a first surface, and other stepping yokes may be positioned on a second surface, wherein the first and second surfaces are parallel.

Figure 10A:
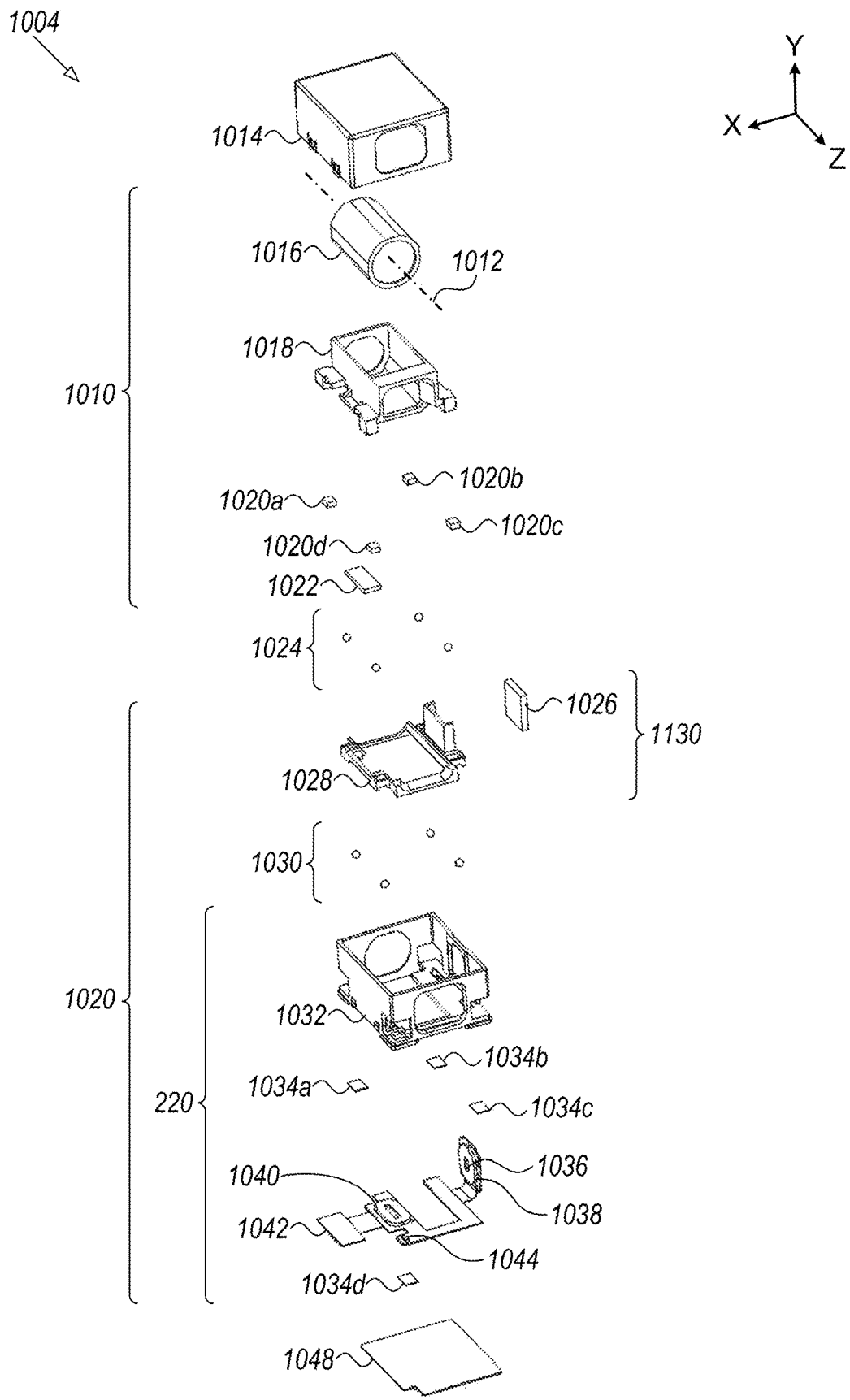
FIG. 10A shows an exploded view of an embodiment and various parts of a folded camera lens sub-assembly according to some aspects of presently disclosed subject matter.
Figure 10B:
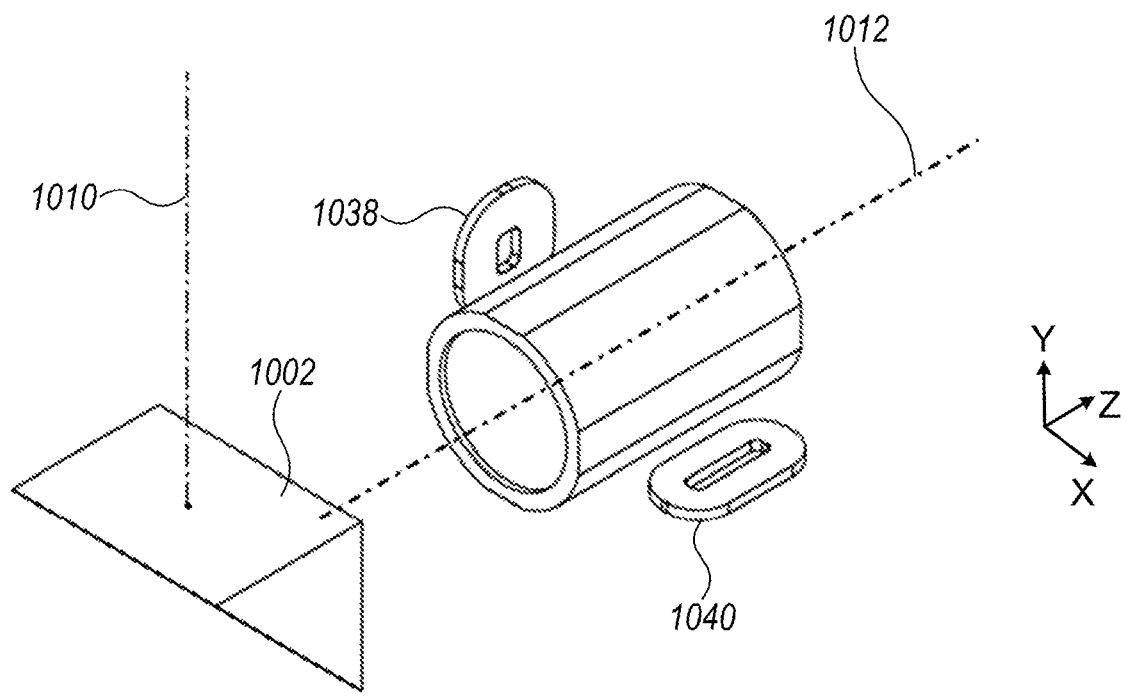
FIG. 10B shows the positioning of the AF and OIS coils relative to the lens optical axis from one view.
Figure 10C:
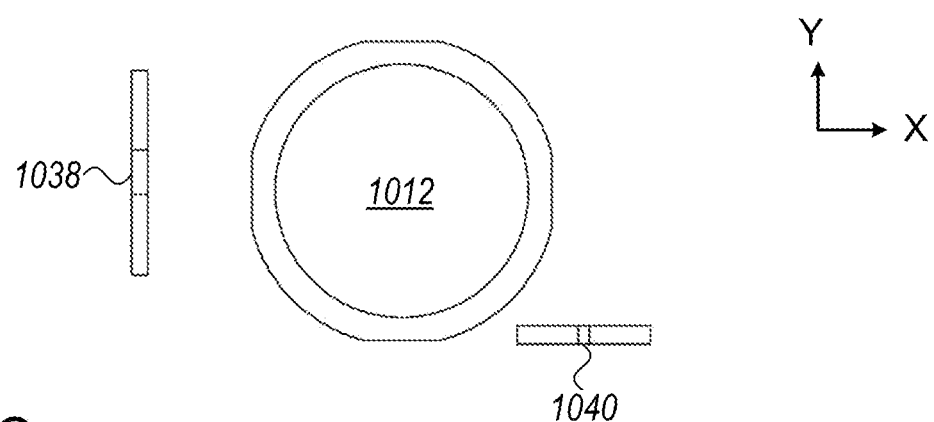
FIG. 10C shows the positioning of the AF and OIS coils relative to the lens optical axis from another view.

FIGS. 10B and 10C show the positioning of AF coil 1038 and OIS coil 1040 relative to the lens optical axis 1012 from two different views. Each coil has a stadium shape, such that it has two long dimensions (typically 1-5 mm long) and one short dimension (typically 0.1-0.5 mm thick). Each coil typically has a few tens of windings (for example, in a non-limiting range of 50-250), with an exemplary resistance of 10-30 ohm. The plane in which the long dimensions of the coil reside will be considered henceforth to be the respective "coil plane". In the example shown, an "OIS coil plane" of OIS coil 1040 is parallel to the XZ plane, namely its two long dimensions are in XZ plane while its short dimension is along the Y axis. In the example shown, an "AF coil plane" of AF coil 1038 is parallel to the YZ plane, namely its two long dimensions are in the YZ plane while its short dimension is along the X axis. Thus, in this example the OIS coil plane is perpendicular to the AF coil plane. In an embodiment, OIS coil 1040 faces OIS magnet 1022 (FIG. 10A). The OIS magnet is a fixed (i.e. permanent) magnet. Magnet 1022 may be fabricated (e.g. sintered, cut) such that it has a changing magnetic field polarity: on its positive X size, OIS magnet 1022 has a magnetic field facing the negative Y direction, while on its negative X side, OIS magnet 1022 has a magnetic field facing the positive Y direction. Upon driving of current in OIS coil 1040, a Lorenz force is created by the magnetic filed of OIS magnet 1022 on OIS coil 1040 in the negative or positive Y direction. Consequently, an equal force is applied on OIS magnet 1022 in the Y direction. Having OIS coil 1040 in XZ plane has the advantage in that, while in actuation, OIS magnet is kept at a constant distance from OIS coil 1022. That is, Lorentz force for OIS is uniform for different AF positions, and the OIS position reading is linear for OIS motion and uniform for different AF positions.

In the example of FIG. 10B, lens optical axis 1012 is in the Z direction. Each of the OIS and AF planes is parallel to lens optical axis 1012. In addition, relative to a plane defined by the first optical axis 1010 and the second (lens) optical axis 1012, the OIS coil and the AF coil are on opposite sides of this plane. This feature has an advantage in that it reduces magnetic interference of the two VCMs.

In an embodiment, AF coil 1038 faces AF magnet 1026. The AF magnet is a fixed (i.e. permanent) magnet. AF magnet 1026 may be fabricated (e.g. sintered, cut) such that it has a changing magnetic field polarity: on its positive Z size, AF magnet 1026 has a magnetic field facing the negative X direction, while on its negative Z side OIS magnet 1022 has a magnetic field facing the positive X direction. Upon driving of current in AF coil 1038, a Lorenz force is created by the magnetic filed of AF magnet 1026 on AF coil 1038 in the negative or positive Z direction. Consequently, an equal force is applied on AF magnet 1026 in the Z direction. Having AF coil 1038 in YZ plane has the advantage in that, while in actuation, the AF magnet is kept at a constant distance from OIS coil 1040. That is, the Lorentz force for AF is uniform for different OIS positions, and the AF position reading is linear for AF motion and uniform for different OIS positions.

Figure 10D:
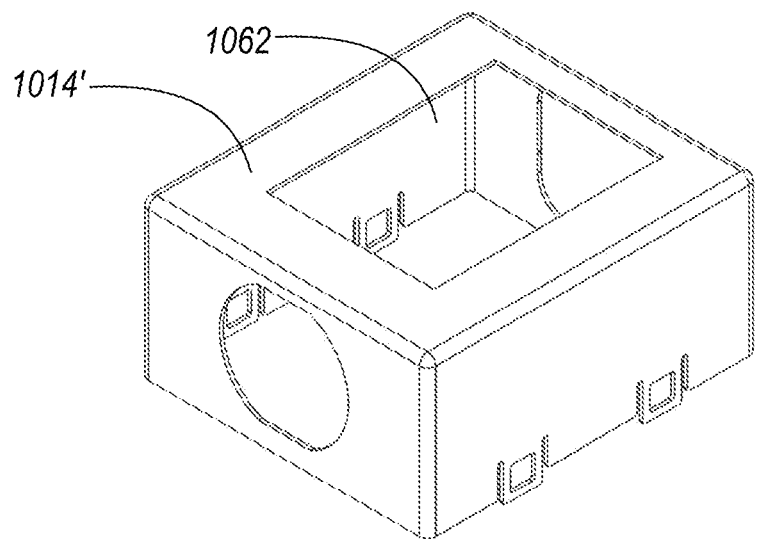
FIG. 10D shows a envelope in the lens sub-assembly of FIG. 10A with an added top opening.
Figure 10E:
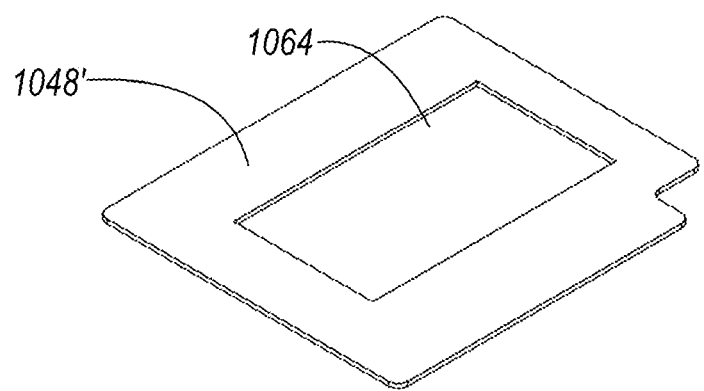
FIG. 10E shows a lower plate in the lens sub-assembly of FIG. 10A with an added bottom opening.

FIG. 10D shows an envelope 1014' which is similar to envelope 1014 in VCM 1004, with an added top opening 1062. FIG. 10E shows a lower plate 1048' similar to lower plate 1048 in VCM 1004, with an added bottom opening 1064. Openings 1062 and 1064 allow reducing the height of VCM 1004, in a manner similar to openings 203 and 304 described above. All descriptions of embodiments 202, 302, 402, with regard to benefits of top and bottom openings are applicable to the description of VCM 1004 and may be used in VCM 1004.

Figure 11A:
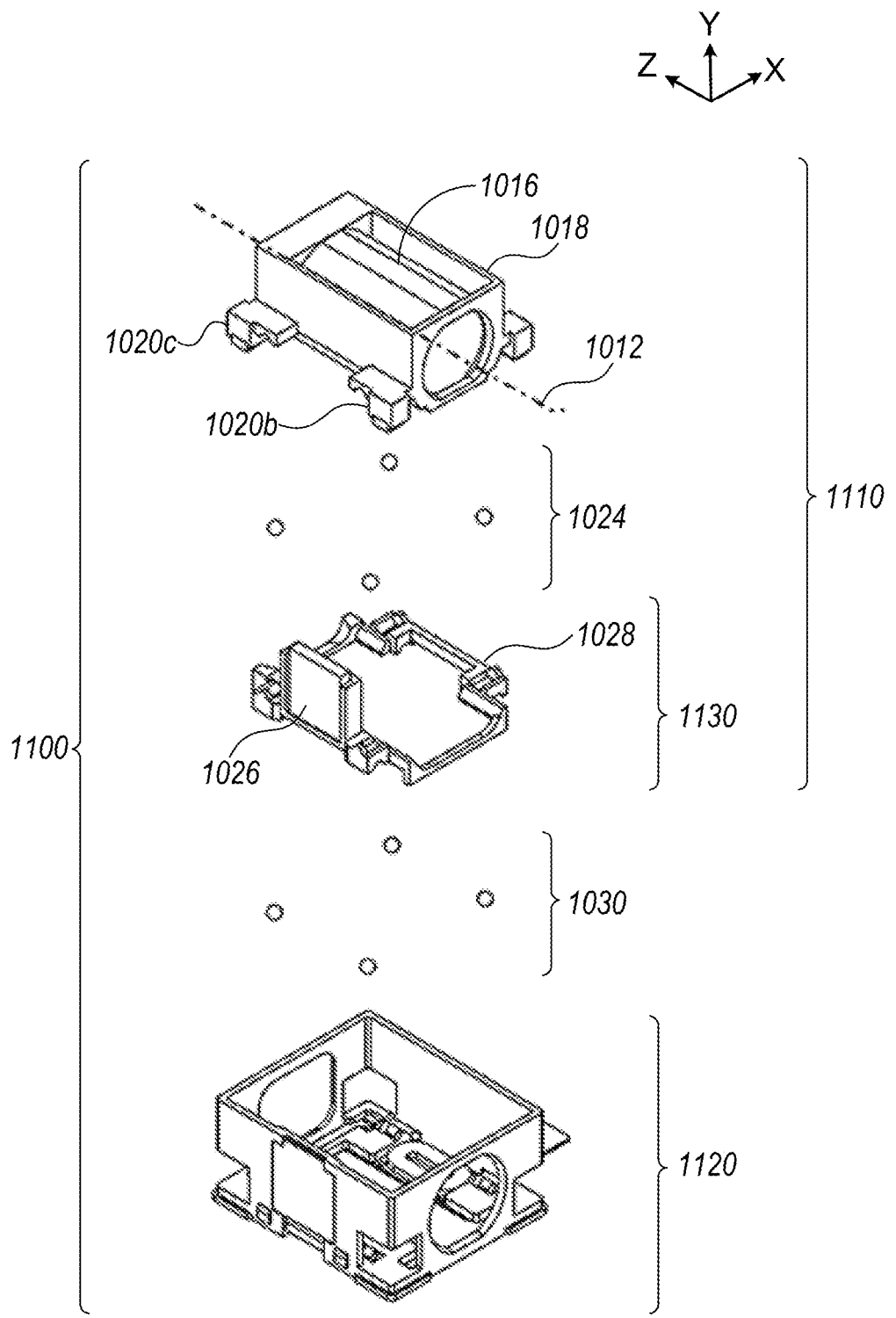
FIGS. 11A and 11B show exploded views from two perspectives of a first VCM actuator in the lens sub-assembly.
Figure 11B:
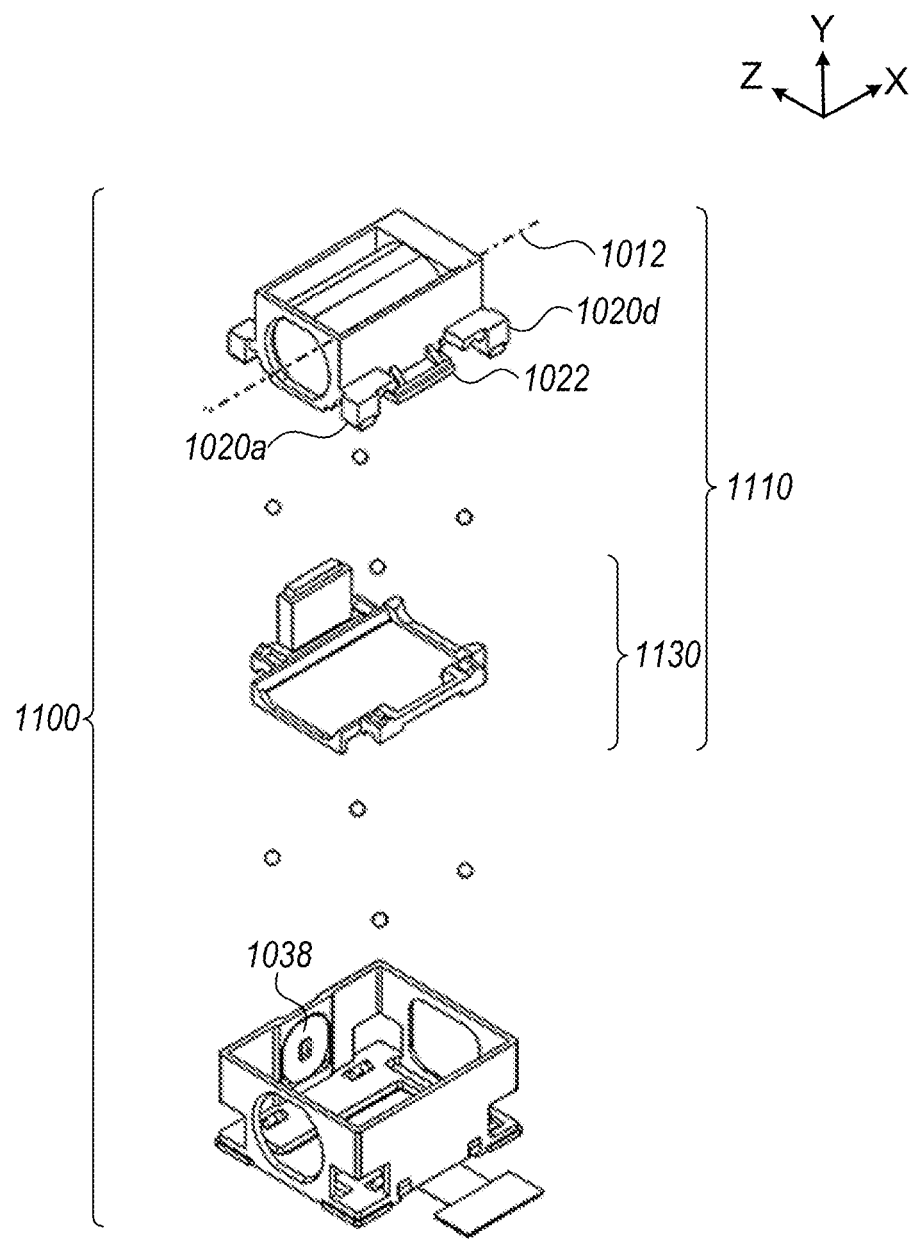

FIGS. 11A and 11B show exploded views from two perspectives of a first VCM actuator numbered 1100 included in lens actuator 1004. In an example, VCM actuator 1100 may be used for AF. In another example, VCM actuator 1100 may be used for OIS. In VCM actuator 1100, a top actuating sub-assembly 1110 is movable relative to an AF stationary sub-assembly 1120 in a direction parallel to optical axis 1012. Top actuating sub-assembly 1110 comprises lens 1016, lens holder 1018, middle chassis 1028, AF magnet 1026 and the four stepping magnets 1020a, b, c and d, OIS magnet 1022, and four upper balls 1024. Middle chassis 1028 and AF magnet 1026 form a middle actuating sub-assembly 1130. AF stationary sub-assembly 1120 comprises a lower stepping yoke 1050, OIS Hall sensor bar 1044, printed circuit board 1042, OIS coil 1040, AF coil 1038, AF Hall sensor bar 1036, four upper stepping yokes 1034a, b, c and d and base 1032 (only some of which are seen in these FIGURES). Middle actuating sub-assembly 1130 is movable relative to an AF stationary sub-assembly 1120 in a direction parallel to optical axis 1012 and movable relative to lens actuating sub-assembly 1210 in a direction perpendicular to optical axis 1012.

Figure 11C:
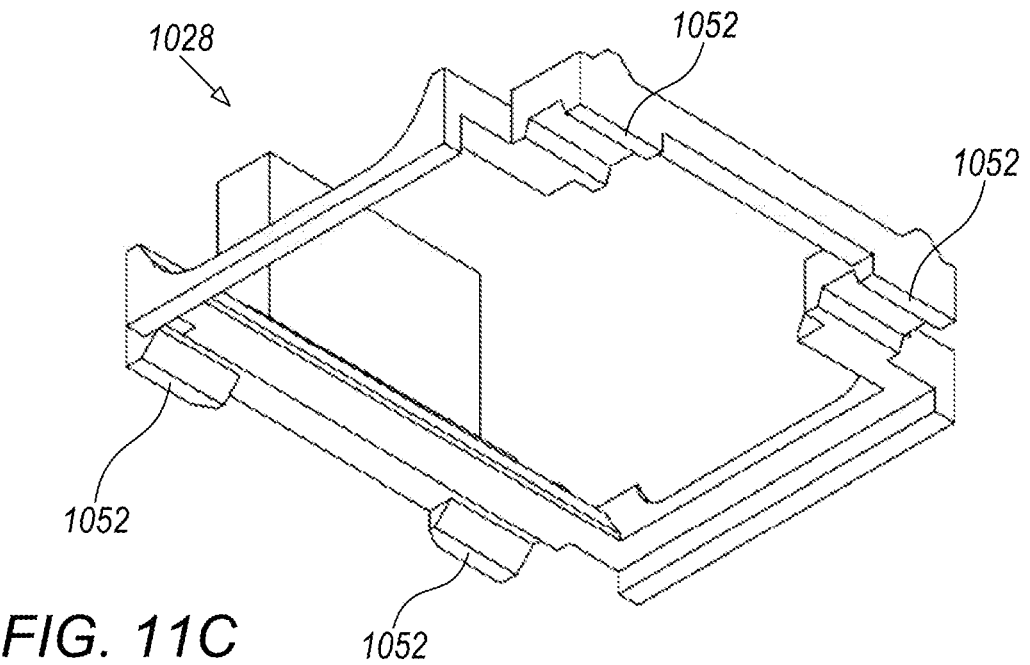
FIGS. 11C and 11D show respectively rails in the middle chassis and rails in the base.
Figure 11D:
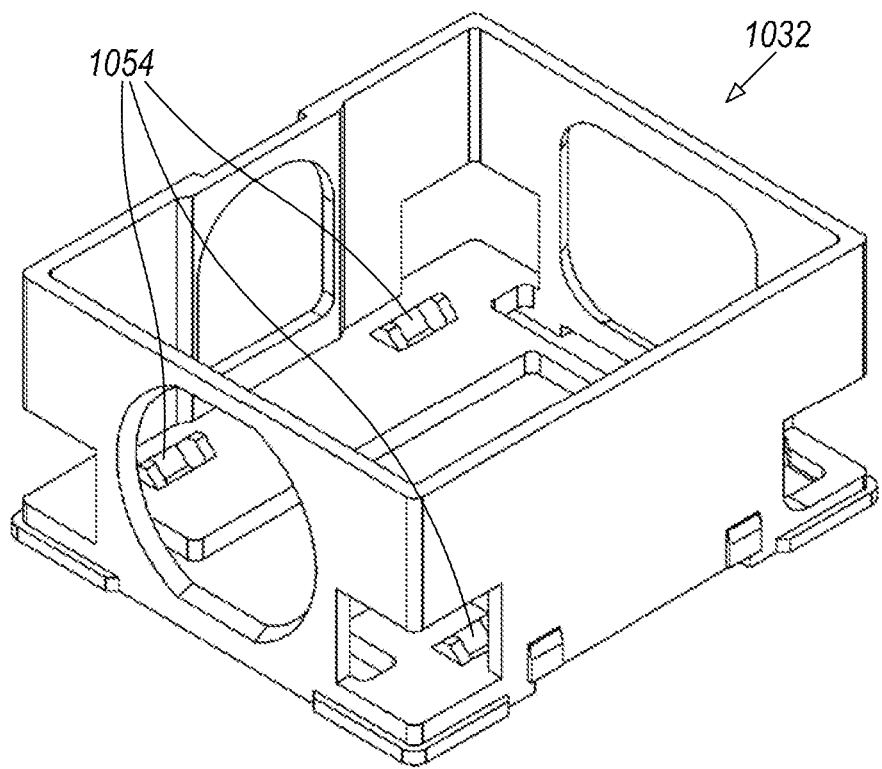

FIGS. 11C and 11D show respectively four rails 1052 in middle chassis 1028 and four rails 1054 in base 1032. While one of rails 1054 is hidden in FIG. 11D, it is understood by a person skilled in the art that its location is symmetric with other visible rails.

In VCM actuator 1100, each of the four rails 1052 faces one respective rail of rails 1054, while one ball of lower balls 1030 is between the rails. The rails and ball structure confines the motion of top actuating sub-assembly 1110 relative to AF stationary sub-assembly 1120 in a direction parallel to optical axis 1012. In addition, top actuating sub-assembly 1110 is pulled to AF stationary sub-assembly 1120 in the Y direction due to the magnetic force of magnets 1020 and upper stepping yokes 1034 (see below), while balls 1030 keep the distance between top actuating sub-assembly 1110 and AF stationary sub-assembly 1120 constant in the Y direction. In this description, the term "constant distance" with respect to moving parts refers to a distance between the parts in a direction perpendicular to the motion direction that is constant with a tolerance of ±10 µm, ±30 µm, ±50 µm, or even ±100 µm.

Figure 12A:
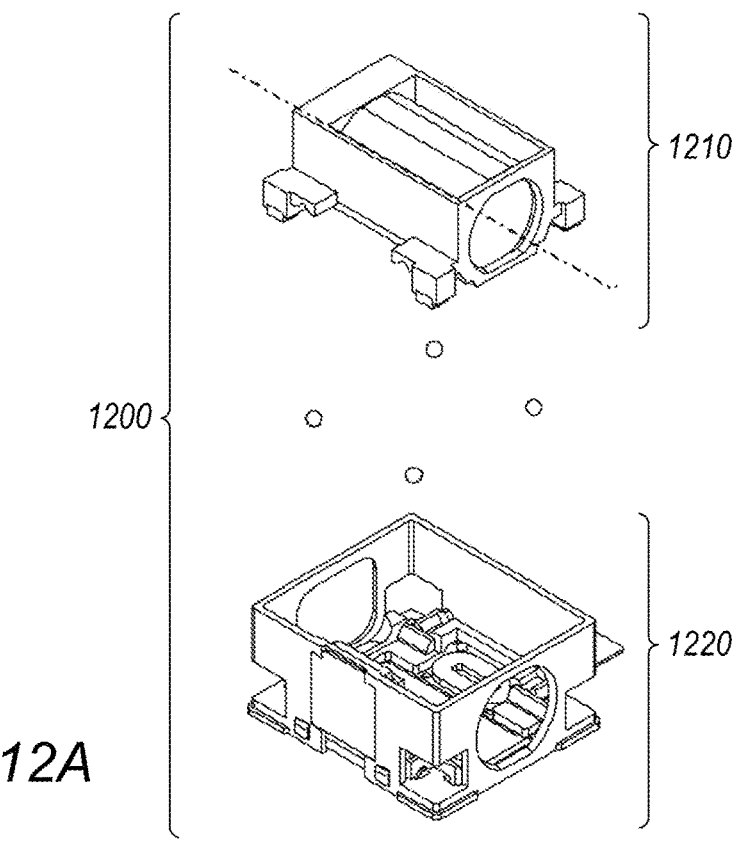
FIGS. 12A and 12B show exploded views from two perspectives of a second VCM actuator in the lens sub-assembly.
Figure 12B:
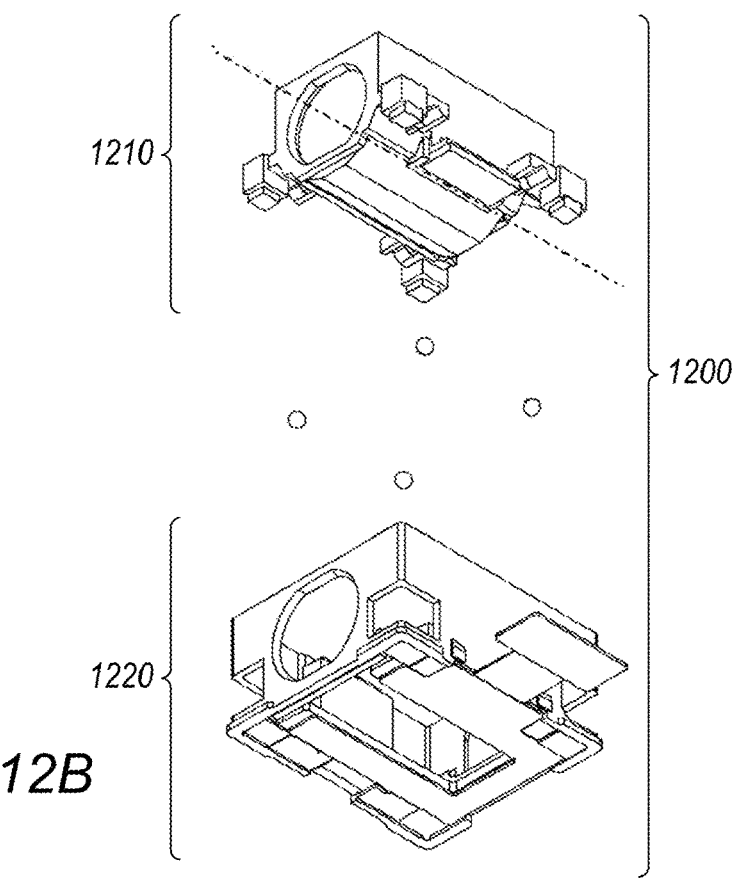

FIGS. 12A and 12B show exploded top and bottom perspective views of a second VCM actuator in lens sub-assembly 1004, numbered 1200. VCM actuator 1200 includes a lens actuating sub-assembly 1210 movable relative to an OIS stationary sub-assembly 1220. VCM actuator 1200 may be used for OIS. Lens actuating sub-assembly 1210 comprises lens 1016, lens holder 1018, four stepping magnets 1020 and OIS magnet 1022 (which is also part of top actuating sub-assembly 1110). OIS stationary sub-assembly 1220 comprises lens holder 1018, middle chassis 1028, AF magnet 1026, AF stationary sub-assembly 1120 and the four lower balls 1030.

Figure 12C:
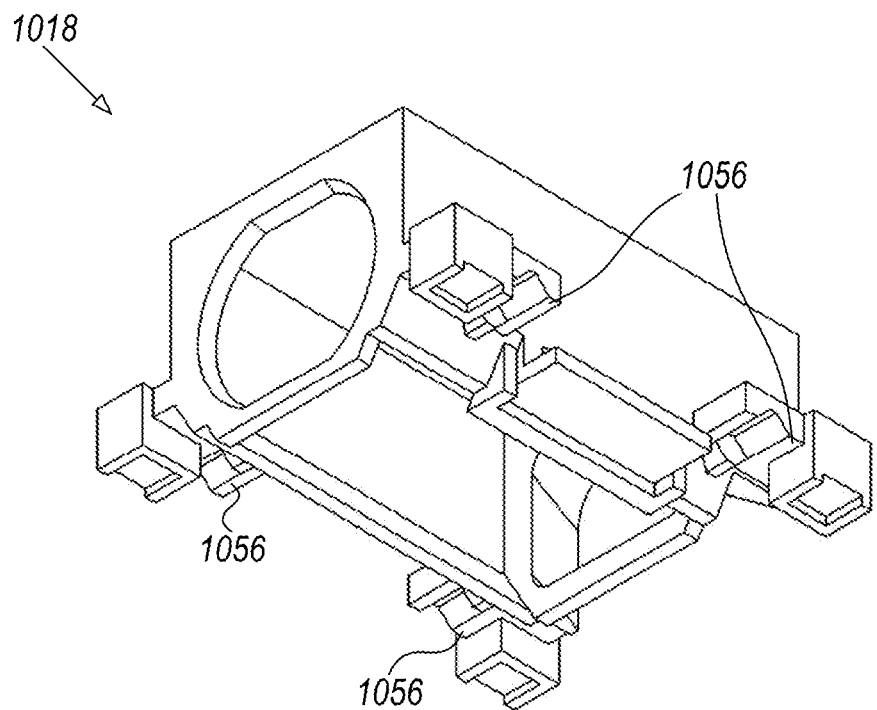
FIGS. 12C and 12D show respectively rails in the middle chassis and rails in the base.
Figure 12D:
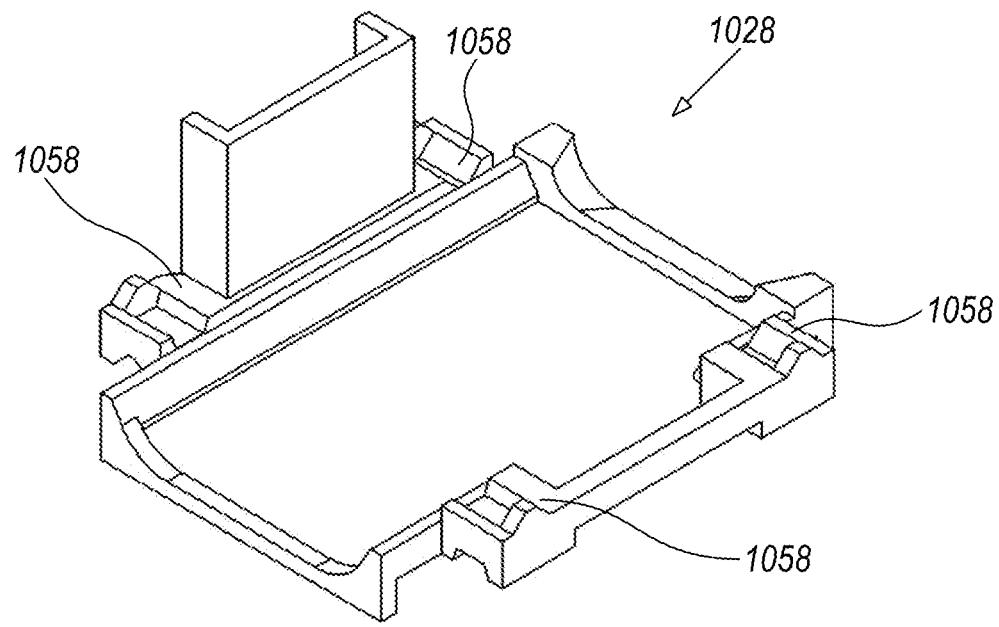

FIGS. 12C and 12D show respectively four rails 1056 in lens carrier 1018 and four rails 1058 in middle chassis 1028. In VCM actuator 1200, each of the four rails 1056 faces one respective rail of rails 1058, while one ball of upper balls 1024 is between the rails. The rails and ball structure confine the motion of lens actuating sub-assembly 1210 relative to OIS stationary actuating sub-assembly 1220 in a direction perpendicular to optical axis 1012. In addition, lens actuating sub-assembly 1210 is pulled to OIS stationary sub-assembly 1220 in the Y direction due to the magnetic force of magnets 1020a,b, c and d and stepping yokes 1034a,b, c and d (see below), while upper balls 1024 keep the distance between lens actuating sub-assembly 1210 and OIS stationary sub-assembly 1220 constant in the Y direction.

In some embodiments, the lens actuating sub-assembly is pulled toward the stationary sub-assembly, with the middle actuating sub-assembly positioned therebetween.

In use of actuator 1100 for AF, an electrical current in AF coil 1038 creates force on AF magnet 1026, driving middle chassis 1028 in directions parallel to lens optical axis 1012, for example along the positive or negative Z direction. Middle chassis 1028 holds lens actuating sub-assembly 1210 and while moving in the AF direction it carries lens actuating sub-assembly 1210 along, such that lens 1016 is operative to focus on image sensor 1006, as required by optical demands. The AF movement is directed by the rolling and/or sliding of the four lower balls 1030 inside the four respective rails 1052 located in middle chassis 1028 and inside four compatible rails 1054 located in base 1032.

In use of actuator 1200 for OIS, electrical current in OIS coil 1040 creates force on OIS magnet 1022, driving lens carrier 1018 in directions perpendicular to the lens optical axis 1012 and parallel to the X axis (shown in the exemplary coordinate system XYZ). During this movement, lens carrier 1018 (which holds lens 1016) moves together with the lens in any OIS direction. The movement for OIS is directed by the rolling and/or sliding of four upper balls 1024 inside four rails 1056 located on lens carrier 1018 and inside another four compatible rails 1058 located on the middle chassis 1028.

Figure 13A:
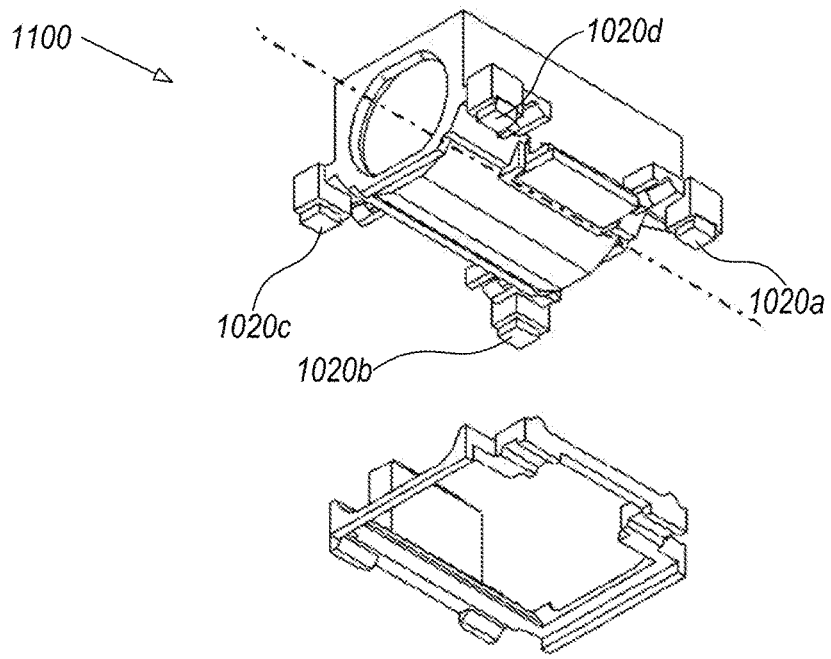
FIGS. 13A and 13B show parts of the lens sub-assembly related to the actuation.
Figure 13A:
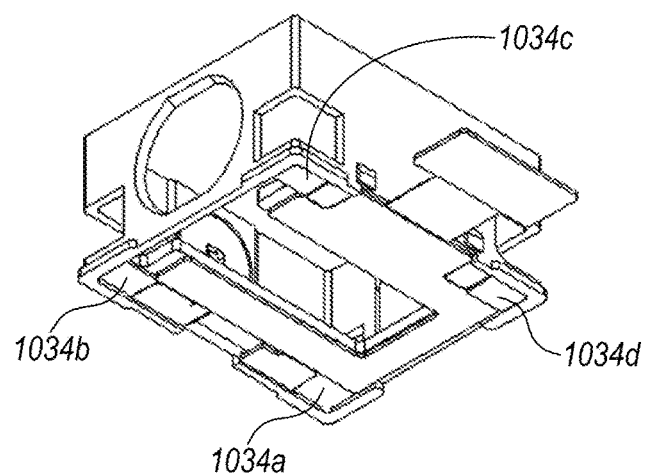
Figure 13B:
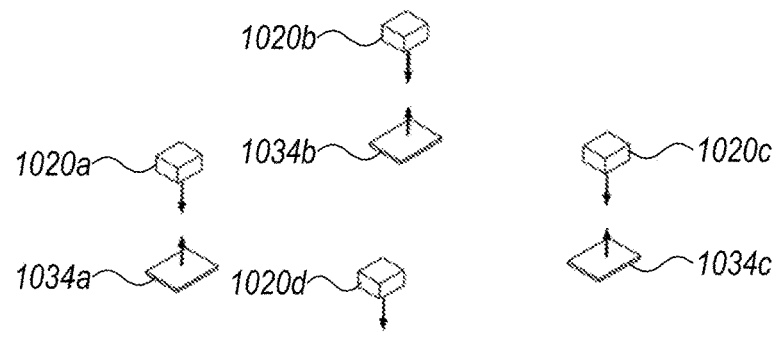

The four stepping magnets 1020a, 1020b, 1020c and 1020d located on the lens carrier 1018 are associated with four stepping yokes 1034*a*, 1034*b*, 1034*c* and 1034*d* located on AF stationary sub-assembly 1120, creating a stepping force indicated by arrows in a direction perpendicular to optical axis 1012. Stepping magnets 1020*a*-*d* and stepping yokes 1034*a*-*d* are seen in FIG. 13A, which shows an exploded view of VCM 1100, and in FIG. 13B which shows only the magnets and yokes along with the force direction, which is directed in the negative Y direction. In an embodiment, lens actuating sub-assembly 1210 is pulled toward AF stationary sub-assembly 1120, while OIS stationary sub-assembly 1220 is positioned therebetween. Upper balls 1024 located between lens actuating sub-assembly 1210 and OIS stationary sub-assembly 1220 prevent contact between the two sub-assemblies. Similarly, lower balls 1030 located between OIS stationary sub-assembly 1220 and AF stationary sub-assembly 1120 prevent contact between the two sub-assemblies. At the same time, the pull force created between four stepping magnets 1020 and four stepping yokes 1034 hold actuator 1100 as one unit and prevent all moving parts from coming apart. In some examples, the three stepping magnets are used only for stepping, while the fourth magnet is used for stepping and sensing.

Figure 14A:
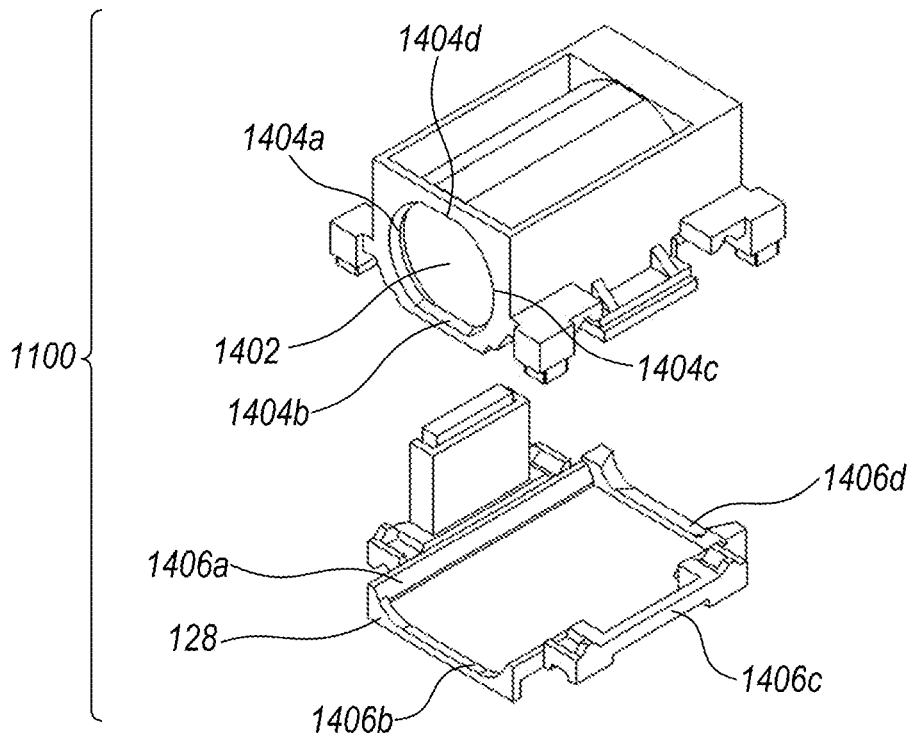
FIGS. 14A and 14B show the top actuating sub-assembly in respectively, an exploded perspective view and an assembled view.
Figure 14B:
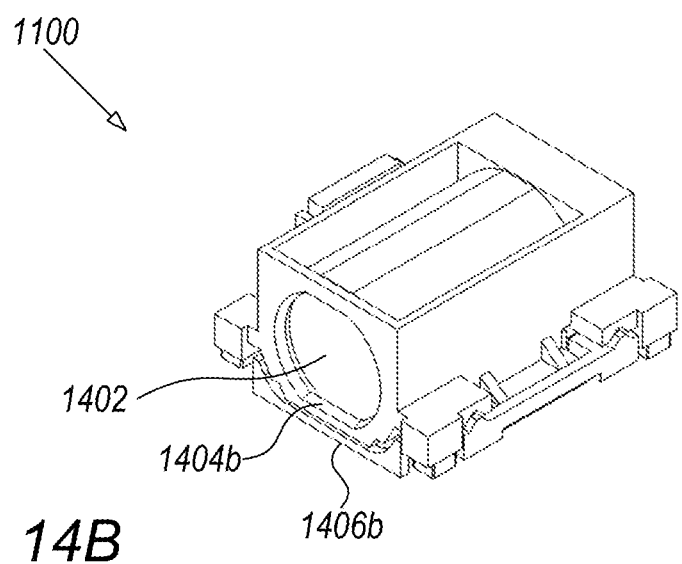
Figure 14C:
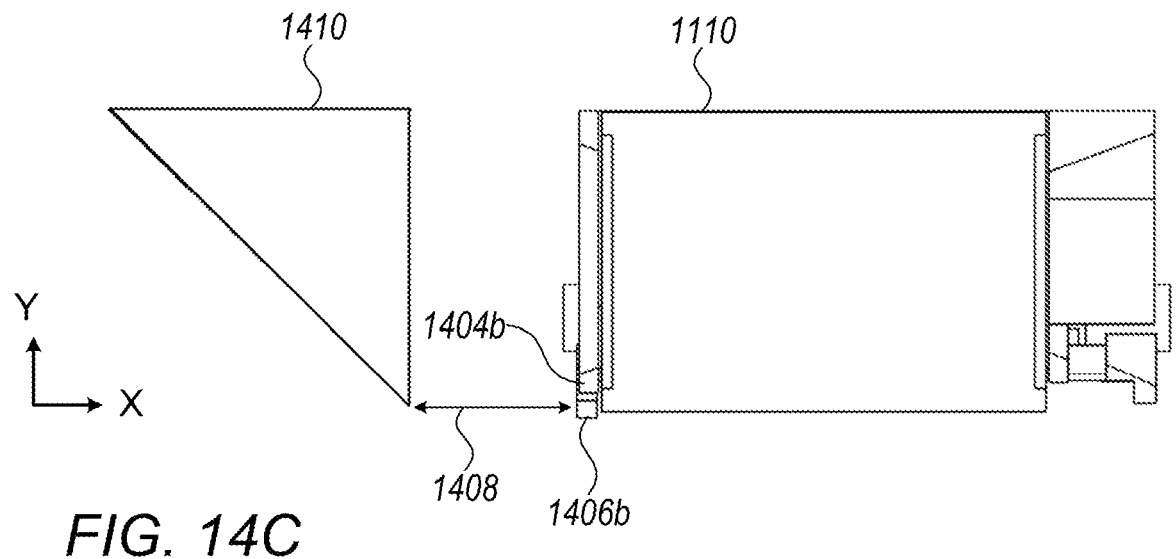
FIGS. 14C and 14D show two different embodiments in cross section along the optical axis of the top actuating sub-assembly of FIGS. 14A, 14B and a prism.
Figure 14D:
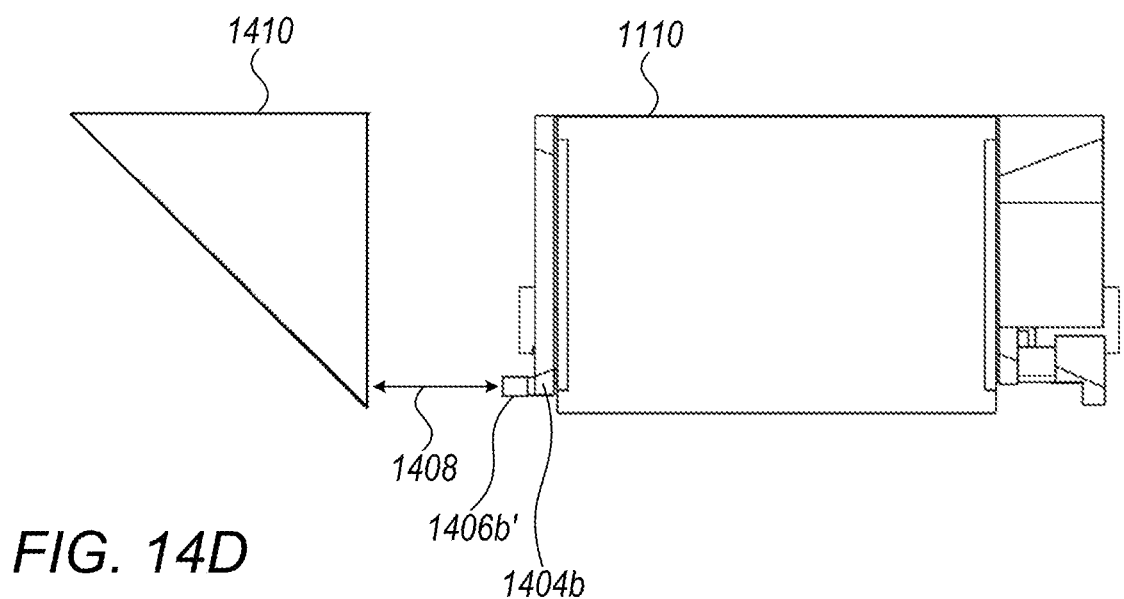

FIGS. 14A and 14B show top actuating sub-assembly 1110 in, respectively, an exploded perspective view and an assembled view. In some embodiments, lens carrier 1018 has an opening 1402 which allows light to pass from an OPFE to lens 1016. Opening 1402 is surrounded by walls 1404 *a, b, c* and *d*. In an embodiment, middle chassis 1028 comprises walls 1406 *a, b, c* and *d*. Wall 1406*b* can be used to add mechanical strength and connect between the rails. FIGS. 14C and 14D show two different embodiments in cross section along the optical axis of top actuating sub-assembly 1110 and a prism 1410. The embodiments shown in FIGS. 14C and 14D describe two relative positions of walls 1406*b* and 1404*b*. In the embodiment of FIG. 14C, wall 1406*b* is located below wall 1404*b* (in the −Y direction).

In contrast, in the embodiment of FIG. 14D wall 1406*b*' replaces wall 1406*b* and is located beside wall 1404*b* (in the −Z direction). A distance 1408 denotes the minimal distance of top actuating sub-assembly 1110 from prism 1410. Distance 1408 is determined by a stroke for AF of top actuating sub-assembly 1110, as required by optical needs and assembly tolerances, as required by mechanical needs. Distance 1408 is constant in both configurations (FIGS. 14C and 14D). Thus, the configuration in FIG. 14C has an advantage, since it allows a shorter actuator along the optical axis direction (−Z direction), namely a reduction in the length of folded camera 1000 (FIG. 10A).

Figure 15:
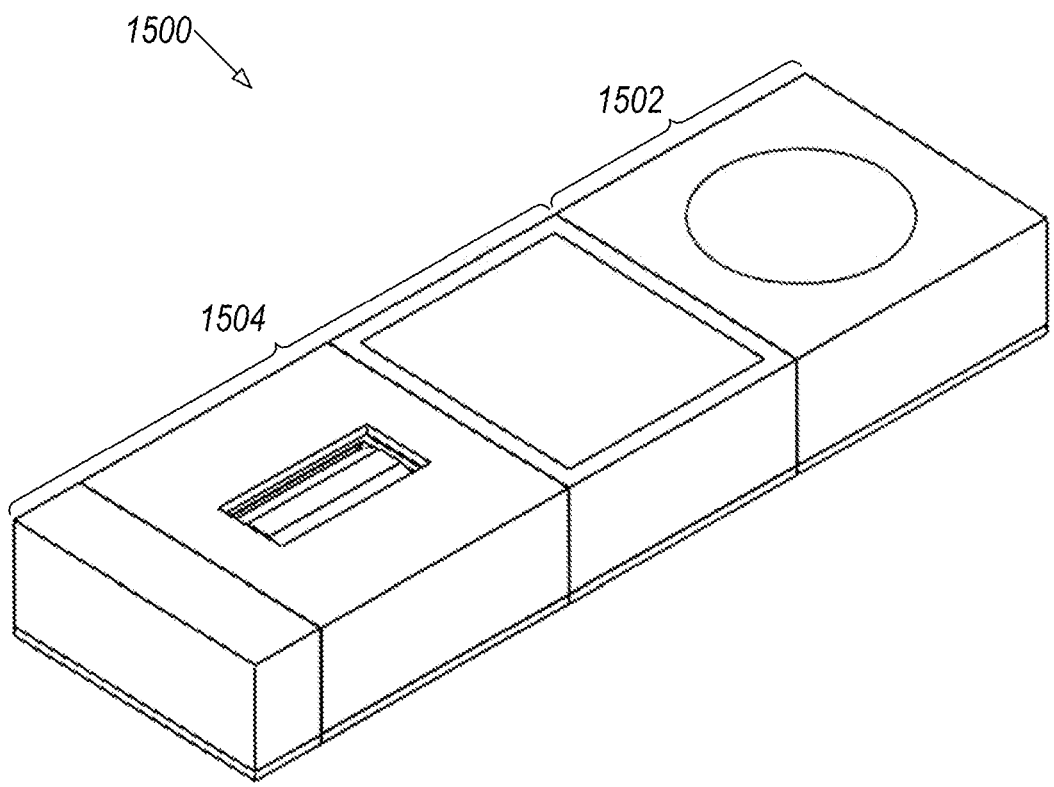
FIG. 15 shows an embodiment of a dual camera comprising an upright camera and a folded camera with an actuator disclosed above or below.

FIG. 15 shows a dual camera 1500 comprising an upright camera 1502 and a folded camera 1504. Folded camera 1504 may include a lens actuator like any actuator/VCM disclosed above, for example actuators/VCMs 102, 202, 302, 402, 502 or 1004.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. An actuator suitable to be used in a folded camera and configured to actuate a lens having a lens optical axis for auto-focus (AF) and optical image stabilization (OIS), the actuator comprising:
    a) a stationary sub-assembly that includes an OIS coil having an OIS coil plane and an AF coil having an AF coil plane; and
    b) a lens actuating sub-assembly movable relative to the stationary sub-assembly and including a lens holder holding the lens,
        wherein the OIS coil plane is perpendicular to AF coil plane and wherein the lens optical axis lies between the OIS coil plane and the AF coil plane, and
        wherein the OIS coil and the AF coil are on opposite sides of a plane defined by the lens optical axis and an entrance optical axis in the folded camera.

2. The actuator of claim 1, wherein the stationary sub-assembly further includes a plurality of upper stepping yokes, wherein the lens actuating sub-assembly further includes a plurality of stepping magnets coupled to the plurality of upper stepping yokes, and wherein the plurality of stepping yokes and the plurality of stepping magnets are operable to create stepping forces in a direction perpendicular to the lens optical axis for stepping.

3. The actuator of claim 2, wherein the stationary sub-assembly further includes an OIS Hall sensor bar used in conjunction with one of the stepping magnets to perform position sensing.

4. The actuator of claim 2, wherein some yokes of the plurality of upper stepping yokes are positioned on a first surface, wherein other yokes of the plurality of upper stepping yokes are positioned on a second surface, and wherein the first and second surfaces are parallel.

5. The actuator of claim 1, further comprising a middle actuating sub-assembly for AF and OIS positioned between the stationary sub-assembly and the lens actuating sub-assembly.

6. The actuator of claim 1, wherein the OIS coil is a single OIS coil and wherein the AF coil is a single AF coil.

7. The actuator of claim 6, wherein the single OIS coil is mounted on a bottom of the stationary sub-assembly and wherein the single AF coil is mounted on a side of the stationary sub-assembly.

* * * * *